(12) United States Patent
Thyagarajan et al.

(10) Patent No.: US 12,199,496 B2
(45) Date of Patent: Jan. 14, 2025

(54) SYSTEM AND METHOD FOR CONTROLLING PARALLEL INVERTERS COUPLED TO COMMON DC BUS CAPACITOR

(71) Applicant: Deere & Company, Moline, IL (US)

(72) Inventors: Lav Thyagarajan, West Fargo, ND (US); Morgan E. Schlichtmann, Fargo, ND (US); Christopher J. Tremel, West Fargo, ND (US); David M. Loken, West Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 140 days.

(21) Appl. No.: 18/176,509

(22) Filed: Mar. 1, 2023

(65) Prior Publication Data

US 2024/0146175 A1 May 2, 2024

Related U.S. Application Data

(60) Provisional application No. 63/381,589, filed on Oct. 31, 2022.

(51) Int. Cl.
*H02M 7/48* (2007.01)
*H02J 3/38* (2006.01)
*H02M 1/00* (2006.01)
*H02M 7/521* (2006.01)
(Continued)

(52) U.S. Cl.
CPC ............ *H02M 1/0074* (2021.05); *H02J 3/38* (2013.01); *H02M 1/0009* (2021.05); *H02M 1/0043* (2021.05); *H02M 7/521* (2013.01); *H02P 27/08* (2013.01); *H02J 2203/20* (2020.01);
(Continued)

(58) Field of Classification Search
CPC ...... H02M 1/009; H02M 1/0043; H02M 7/48; H02M 7/53871
See application file for complete search history.

(56) References Cited

U.S. PATENT DOCUMENTS

| 10,632,999 B2 | 4/2020 | Thyagarajan et al. |
| 2016/0156291 A1* | 6/2016 | Becker ................. H02P 21/30 318/400.26 |
| 2018/0091036 A1 | 3/2018 | Das et al. |

(Continued)

OTHER PUBLICATIONS

C. Sowmya et al., Using artificial intelligence inverter power control which is based on DC link voltage regulation for IPMSM drives with electrolytic capacitor, AIP Conference Proceedings, Feb. 28, 2020, [online]. Retrieved from the Internet: <URL: https://pubs.aip.org/aip/acp/article-abstract/2207/1/050001/972938/Using-artificial-intelligence-inverter-power?redirectedFrom=fulltext>.

(Continued)

*Primary Examiner* — Gary A Nash

(57) ABSTRACT

A capacitor has a known capacitance value for filtering the ripple current of the DC voltage bus. A first modulation index estimator is configured to estimate a first modulation index of the first inverter. A second modulation index estimator configured to estimate a second modulation index of the second inverter. A current estimator is configured to estimate an interleaving phase shift angle associated with a respective one of a set of inverters based on the known capacitance value of the capacitor, the estimated first modulation index, the estimated second modulation index, the first control input and the second control input.

22 Claims, 8 Drawing Sheets

(51) Int. Cl.
*H02M 7/5387* (2007.01)
*H02P 27/08* (2006.01)

(52) U.S. Cl.
CPC ............ *H02M 1/009* (2021.05); *H02M 7/48* (2013.01); *H02M 7/53871* (2013.01)

(56) References Cited

U.S. PATENT DOCUMENTS

| | | | |
|---|---|---|---|
| 2018/0205340 A1 | 7/2018 | Chen et al. | |
| 2018/0226879 A1 | 8/2018 | Wang et al. | |
| 2018/0269791 A1 | 9/2018 | Shamsi et al. | |
| 2019/0305667 A1 | 10/2019 | Wang et al. | |
| 2020/0052575 A1 | 2/2020 | Wang et al. | |
| 2020/0395869 A1* | 12/2020 | Li | H02M 7/4826 |
| 2021/0006178 A1 | 1/2021 | Kumar et al. | |
| 2021/0091681 A1* | 3/2021 | Abuelnaga | H02M 5/4585 |

OTHER PUBLICATIONS

Extended European Search Report and Written Opinion issued in European Patent Application No. 23192919.1, dated Feb. 8, 2024, in 13 pages.

Lee June-Hee et al., Optimal phase shifted method to reduce current ripples for parallel grid-connected voltage source inverter under unequal DC-link voltages, 2017 IEEE Energy Conversion Congress and Exposition (ECC), IEEE, Oct. 1, 2017, pp. 4589-4594, DOI: 10.1109/ECCE.2017.8096785, [online], [retrieved on Nov. 3, 2017]. Retrieved from the Internet <URL: https://ieeexplore.ieee.org/stamp/stamp.jsp?tp=&arnumber=8096785>.

Xu Tao et al., Global Synchronous Pulse Width Modulation of Distributed Inverters, IEEE Transactions on Power Electronics, Institute of Electrical and Electronics Engineers, USA, vol. 31, No. 9, Sep. 1, 2016, pp. 6237-6253, ISSN: 0885-8993, DOI: 10.1109/TPEL.2015.2504361, [online], [retrieved on Mar. 24, 2016]. Retrieved from the Internet <URL: https://ieeexplore.ieee.org/stamp/stamp.jsp?tp=&arnumber=7339679>.

* cited by examiner

SYSTEM AND METHOD FOR CONTROLLING PARALLEL INVERTERS COUPLED TO COMMON DC BUS CAPACITOR

RELATED APPLICATION

This document (including the drawings) claims priority and the benefit of the filing date based on U.S. provisional application No. 63/381,589, filed Oct. 31, 2022, under 35 U.S.C. § 119 (e), where the provisional application is hereby incorporated by reference herein.

TECHNICAL FIELD

This disclosure relates to a system and method for controlling parallel inverters coupled to a common direct current bus capacitor (e.g., to manage or minimize DC bus current).

BACKGROUND

In certain prior art, if multiple inverters are coupled to a common DC bus, the DC ripple current can be reduced somewhat by selection of an interleaving angle with respect to the same phase of a different inverter. Although it is common to use a fixed interleaving angle that is calculated based on the number of inverters in parallel in accordance with an equation such as, 360 degrees/N, where N is the number of parallel inverters, the static or fixed interleaving angle may not be optimal for managing or minimizing the DC bus current because of engineering factors that are not fully accounted for in the above equation. The above equation can also be expressed as 360 degrees*n/N, where n is the number of interleaving phase angles or n=N-1 and where N is the number of parallel inverters, among other possibilities. Therefore, there is a need for an improved system for controlling parallel inverters coupled to a common direct bus capacitor to manage or minimize DC bus current.

SUMMARY

In accordance with one aspect of the disclosure, a system is configured for controlling a first inverter and a second inverter that are coupled to a common DC voltage bus. The first inverter has inputs coupled to the DC voltage bus and outputs coupled to a corresponding first electric machine to provide a first control input (e.g. with a respective interleaving phase shift for a corresponding inverter phase) based on a first command (e.g., torque, speed or other user input). Similarly, the second inverter has inputs coupled to the DC voltage bus and outputs coupled to a corresponding second electric machine to provide a second control input (e.g. with a respective interleaving phase shift for a corresponding inverter phase) based on a second command (e.g., torque, speed or other user input). A capacitor has a known capacitance value for filtering the ripple current of the DC voltage bus. A first modulation index estimator is configured to estimate a first modulation index of the first inverter. A second modulation index estimator configured to estimate a second modulation index of the second inverter. A managed current estimator is configured to estimate an interleaving phase shift angle associated with a respective one of the inverters (e.g., associated with a respective minimum capacitor current of the DC bus capacitor) based on the known capacitance value of the capacitor, the estimated first modulation index, the estimated second modulation index, the first control input and the second control input.

In accordance with another aspect of the disclosure, an optional sensor or optional ripple current observer provides observed ripple current of the DC voltage bus, such that the minimum current estimator is configured to estimate an interleaving phase shift angle associated with a respective one of the inverters (e.g., and a respective minimum capacitor current) based on the observed ripple current, the known capacitance value of the capacitor, the estimated first modulation index, the estimated second modulation index, the first control input and the second control input.

In accordance with yet another aspect of the disclosure, the interleaving phase shift angle comprises a particle position of a particle swarm optimization (PSO) to search for the interleaving phase shift angle to minimize or manage DC bus current.

In accordance with still another aspect of the disclosure, the observed ripple current of the DC voltage bus comprises a particle cost of a particle swarm optimization model to search for the interleaving phase shift angle to minimize or manage DC bus current.

Other features and aspects will become apparent by consideration of the detailed description, claims, and accompanying drawings.

BRIEF DESCRIPTION OF THE DRAWINGS

Like reference numerals are used to indicate like elements throughout the several figures.

DETAILED DESCRIPTION

Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances (e.g., plus or minus about ten percent) or positional relationships associated with manufacturing, assembly, and use of the described embodiments.

Figure 1:
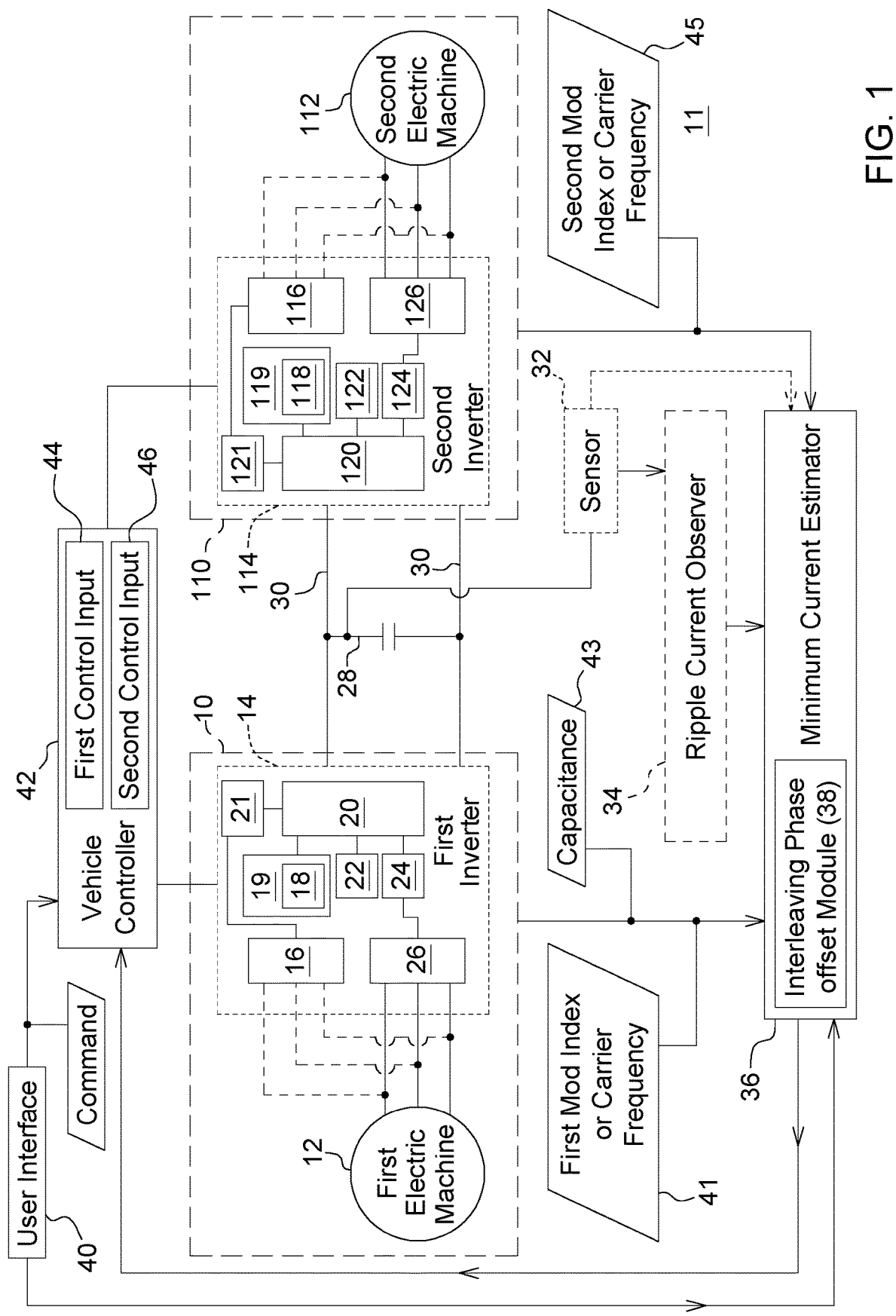
FIG. 1 is a block diagram of one embodiment a first inverter and a second inverter coupled to a direct current bus for managing or minimizing the DC bus current.

In accordance with one aspect of the disclosure, in FIG. 1 a system 11 comprises a first control system 10 and a second control system 110. The system 11 is configured for controlling a first inverter 14 and a second inverter 114 that are coupled to a common DC voltage bus 30, which has a DC bus capacitor 28 to filter or reduce ripple current on the DC voltage bus 30. The first inverter 14 has inputs coupled to the DC voltage bus 30 and outputs coupled to a corresponding first electric machine 12 to provide a first control input 44 (e.g. a torque command, speed command or other command, alone or together with a respective interleaving phase shift for a corresponding inverter phase) based on a first command (e.g., torque, speed or other user input via the user interface 40). Similarly, the second inverter 114 has inputs coupled to the DC voltage bus 30 and outputs coupled to a corresponding second electric machine 112 to provide a second control input 46 (e.g. a torque command, speed command or other command, alone or together with a respective interleaving phase shift for a corresponding inverter phase) based on a second command (e.g., torque, speed or other user input via the user interface 40).

In one embodiment, the first inverter 14 comprises an electronic data processor 22 (e.g., first electronic data processor), a data storage device 19 (e.g., first data storage device), a driver 24 (e.g., first driver), and data port 21 (e.g., first data port) that are coupled to a data bus 20 (e.g., first data bus) to support communications among and between the electronic data processor 22, the data storage device 19, the driver 24, and the data port 21. The data storage device 19 may comprise a control module 18 (e.g., first control module), such a torque control module, a volt per hertz control module, or another control module that provides, via the driver 24, control signals (e.g., in a motoring mode, generating mode, regeneration mode) to the first switching module 26 (e.g., first semiconductor switch module or semiconductor switches) to control the pulse width modulation (PWM), switching, rectification, or other modulation or processing of the alternating current (AC) signals of the first electric machine 12. The first switching module 26 is coupled to the windings or AC terminals of the first electric machine 12. The feedback sensor 16 is also coupled to the windings or AC terminals of the first electric machine 12, where the feedback sensor 16 can provide information about one or more of the following: rotor position, rotor speed, rotational direction, rotor velocity, rotor acceleration, observed current, observed voltages, error signal at the AC terminals of the first electric machine 12.

In one embodiment, the second inverter 114 comprises an electronic data processor 122 (e.g., second electronic data processor), a data storage device 119 (e.g., second data storage device), a driver 124 (e.g., second driver), and data port 121 (e.g., second data port) that are coupled to a data bus 120 (e.g., second data bus) to support communications among and between the electronic data processor 122, the data storage device 119, the driver 124, and the data port 121. The data storage device 119 may comprise a control module 118, such a torque control module, a volt per hertz control module, or another control module that provides, via the driver 124, control signals (e.g., in a motoring mode, generating mode, regeneration mode) to the second switching module 126 (e.g., second semiconductor switch module or semiconductor switches) to control the pulse width modulation (PWM), switching, rectification, or other modulation or processing of the alternating current (AC) signals of the first electric machine 12. The second switching module 126 is coupled to the windings or AC terminals of the second electric machine 112, where the feedback sensor 116 can provide information about one or more of the following: rotor position, rotor speed, rotational direction, rotor velocity, rotor acceleration, observed current, observed voltages, error signal at the AC terminals of the first electric machine 112.

An electronic data processor (22, 122) may comprise a microprocessor, a microcontroller, a programmable logic array, a field-programmable gate array (FPGA), a logic device, a digital signal processor (DSP), an application specific integrated circuit (ASIC), a system on chip (SOC), or another data processor for storing, processing and/or manipulating data.

A data storage device (19, 119) comprises electronic memory, non-volatile electronic memory, random access memory, optical storage devices, magnetic storage devices, hard disk drives, or other devices for storing, retrieving, reading, writing and accessing data.

The data port(s) (21, 121) may comprise input/output data ports, such as a communications line transceiver (e.g., universal asynchronous receiver/transmitter (UART), universal serial bus (USB) interface, serial or parallel data port).

The electronic data processor (22, 122) is coupled to a data bus to support communication, execution of software instructions and processing of data associated with the data storage device and the data port(s).

In one embodiment, a user interface 40 is coupled to the vehicle controller 42. The user interface may comprise an electronic display, a keyboard, a touchscreen display, a pointing device (e.g., electronic mouse), switch or set of switches, or sensors (e.g., accelerometers, contact switches, piezoelectric, variable resistors) associated with the steering, braking or propulsion functions of a vehicle. The user interface 40 is configured to support any of the following: (a) inputting data or outputting data, (b) entering, selecting or providing a user command to the vehicle controller 42. The vehicle controller 42 is configured to determine a first control input 44 and the second control input 46 based on the user command. The first control input 44 means a torque command, speed command or other command to control motion of (and manage the load on) the first electric machine 12, alone or together with a respective interleaving phase shift for a corresponding inverter phase. The second control input 46 means a torque command, speed command or other command to control motion of (and manage the load on) the second electric machine 112, alone or together with a respective interleaving phase shift for a corresponding inverter phase.

As illustrated in FIG. 1, a capacitor 28 has a known capacitance 43 value for filtering the ripple current of the DC voltage bus 30. A first modulation index 41 estimator 36 is configured to estimate a first modulation index 41 of the first inverter 14. A second modulation index 45 estimator 36 is configured to estimate a second modulation index 45 of the second inverter 114. A managed current estimator 36 is configured to estimate an interleaving phase shift angle associated with a respective one of the inverters (e.g., associated with a respective minimum capacitor 28 current of the DC bus capacitor 28) based on the known capacitance 43 value of the capacitor 28, the estimated first modulation index 41, the estimated second modulation index 45, the first control input 44 and the second control input 46.

In one embodiment, the estimator 36 may comprise any of the following: (a) an artificial intelligence module, such as particle swarm optimization module, that is capable of executing a particle swarm optimization process, (b) a minimum current estimator of an alternating current component or ripple current of the DC bus voltage; and/or (c) a least squares regression module that is capable of executing a least squares regression process or search process to minimize the error (e.g., sum of the squares of the differences between observed measurements and a linear or nonlinear representation) of a (regression) relationship between a dependent variable and an independent variable.

The particle swarm optimization module is configured to iteratively determine or estimate particle positions, representative of a interleaving phase shift angle, for each particle that represents a potential solution to meet a particle cost objective, such as minimizing of the DC bus ripple capacitor current. In some embodiments, the particle position(s) may vary from negative 180 degrees to positive 180 degrees of the interleaving phase shift angle applied to control inputs of one or more inverters among two or more inverters coupled to a common DC voltage bus. The optimum solution may be reached after a certain critical number of iterations of propagation equations. The swarm size represents that total number of particles. Each particle has a local solution or local particle position that converges toward a global solution or global particle position during each iteration of the particle swarm optimization process by the particle swarm optimization module or by the electronic data processors (22, 122).

In an alternate embodiment, the estimator 36 may comprise a machine learning module, such as a feed forward network (FFN), a temporal convolution neural network (TCN), a convolution neural network, a long short-term memory (LSTM) network, an XGBoost model, a transformer model, a linear regression model, a decision tree model, a random forest model, an gradient boosting machine (GBM), a gradient ascent approach, a gradient descent approach, a recurrent neural network (RNN) or a multilayer perceptron (MLP) model.

In accordance with another aspect of the disclosure, an optional sensor 32 or optional ripple current observer 34 provides observed ripple current of the DC voltage bus 30, such that the minimum current estimator 36 is configured to estimate an interleaving phase shift angle associated with a respective one of the inverters (e.g., and a respective minimum capacitor 28 current) based on the observed ripple current, the known capacitance 43 value of the capacitor 28, the estimated first modulation index 41, the estimated second modulation index 45, the first control input 44 and the second control input 46.

A ripple current observer 34 can determine or estimate the ripple current or alternating current component flowing in the DC bus voltage. For example, the ripple current observer 34 can estimate or determine the current through the DC bus capacitor if the capacitance of the capacitor (e.g., electrolytic capacitor) is known, or the capacitance value is retrieved or read from the data storage device. Further, the ripple current observer 34 can determine or estimate the current, Ic, in the DC bus according to the following equation:

$$I_c = C dV/dt,$$

where Ic is the current in Amperes the capacitor, C is the capacitance in Farads, and dV/dt is a displacement current or change in voltage per unit time. The displacement current can be expressed in units of Amperes. If the ripple current observer 34 and sensor 32 have sufficient bandwidth (e.g., frequency range above DC to include at least the 3 dB bandwidth of AC noise components), it is possible to estimate or derive, via filtering or digital filtering (e.g., high-pass filtering), the alternating current component of the displacement current or ripple current of the displacement current.

In one embodiment, the optional ripple current observer 34 is coupled to the sensor 32; the ripple current observer 34 is configured to estimate an observed ripple current of the DC voltage bus, an alternating current component of the DC voltage bus, or a DC bus capacitor current for one or more time intervals, where the optional ripple current observed can be used as in additional input to the current estimator 36 to promote rapid convergence on a minimum current estimate associated with a corresponding interleaving phase solution for a sampling interval.

In one configuration, the ripple current observer 34 comprises a predictive filter, such as a Kalman filter, for estimating a minimum ripple current of the DC bus voltage or DC bus capacitor, or a minimum alternating current component of the DC bus voltage from current measurements or current observations obtained from a sensor 32, where the sensor 32 (e.g., high bandwidth sensor) comprises a current sensor or a voltage sensor that can be used to derive the ripple current or alternating current component. For example, a predictive filter or Kalman filter may comprises a circuit or a combination of an electronic circuit and software that sums signals, delays signals and incorporates feedback to process sampled data measurements to reduce the effects of noise and uncertainty.

In accordance with yet another aspect of the disclosure, the interleaving phase shift angle comprises a particle position of a particle swarm optimization to search for the interleaving phase shift angle to minimize or manage DC bus current.

In one embodiment, the current estimator 36 (e.g., minimum current estimator) comprises an interleaving phase offset module 38 that dynamically determines or adjusts an interleaving phase shift or phase shift offset for each corresponding time interval for a pulse train of first control signals and second control signals that drive the first inverter 14 and the second inverter 114 via the first driver 24 and the second driver 124, respectively. If two inverters (14, 114) are coupled in parallel to the DC bus terminals of the common DC voltage bus 30, the driver (24, 124) of one of the two inverters (e.g., second inverter 114) will apply the interleaving phase offset or phase shift to the control terminals (164, 264) of its respective semiconductor switches (151-162, inclusive) of the inverter (e.g., second inverter 114), where the interleaving phase offset or phase shift is relative to the phase or reference phase of the control signals applied to the control terminals (154, 264) of the respective semiconductor switches (151-162, inclusive) of the other inverter 14 (e.g., first inverter). Each semiconductor (151-162, inclusive) switch has a respective protection diode (47, 147) connected to its switched terminals (175, 275) to provide a freewheeling mode or protected path for the continued or lagging current during switching transitions (e.g., on-to-off transitions of any semiconductor switches 151-162, inclusive).

Figure 2:
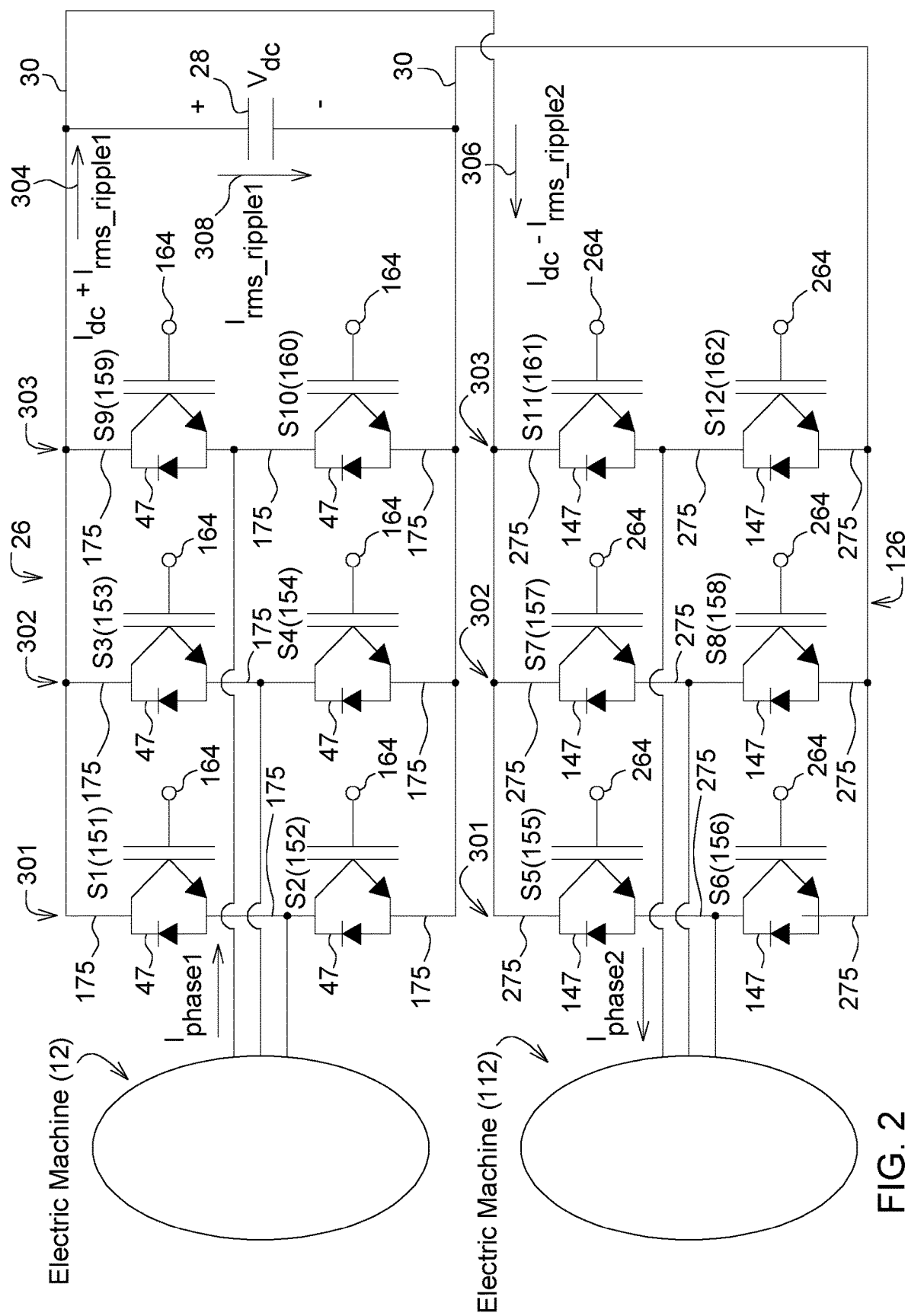
FIG. 2 is schematic of one embodiment of the semiconductor switches for the first inverter and the second inverter in accordance with FIG. 1.

In accordance with still another aspect of the disclosure, the observed ripple current (304, 306) of the DC voltage bus 30 comprises a particle cost of a particle swarm optimization model to search for the interleaving phase shift angle to minimize or manage DC bus current. As illustrated in FIG. 2, the observed current on the DC voltage bus 30 comprises a direct current (DC) component plus an RMS ripple current component, where the RMS ripple current component is an alternating current component that can measured as root-mean-squared current, which is sometimes represented as a percentage of the average current on the DC bus during a sampling interval. The magnitude of the ripple current component may be plus or minus relative to the direct current component, where the equation is expressed as the following: (a) $I_{DC} \pm I_{rms_{ripple1}}$ for the first inverter 12; (b) $I_{DC} \pm I_{rms_{ripple2}}$ at the second inverter 112; (c) $I_{rms_{ripple1}}$, or $I_{rms_{ripple2}}$ or both, for the capacitor 28. The positive or negative sign for the RMS ripple current may depend upon whether the electric machine (12, 112) is operating in a motoring mode, a power generating mode, or regenerative braking mode.

FIG. 2 is schematic of one embodiment of the semiconductor switches for the first inverter 14 and the second inverter 114 in accordance with FIG. 1. In FIG. 2, the first inverter 14 supports one or more alternating current output signals, where each output signal may be associated with a corresponding phase coupled to an electric machine (12, 112). Although each of the inverters (14, 114) has a first phase 301, a second phase 302, and a third phase 303, in practice the inverters may have as few as a single phase configuration or a greater than three phases.

The semiconductor switches (e.g., six semiconductor switches) of the first inverter 14 comprise a first switching module 26 or first power switching module. The semiconductor switches (e.g., six semiconductor switches) of the second inverter 114 comprise a second switching module 126 or second power switching module.

Each phase of the first inverter 14 or second inverter 114 comprises a low-side switch (152, 154, 160, 156, 158, 162) and high-side switch (151, 153, 159, 155, 157, 161). Each low-side switch (152, 154, 160, 156, 158, 162) and high-side switch (151, 153, 159, 155, 157, 161) has switched terminals (175, 275) and a control terminal (164, 264). If the switch comprises a field effect transistor, the switched terminals (175, 275) represent a source and a drain; the control terminal (164, 264) may comprise a gate. However, if the switch comprises a bipolar junction transistor, the switched terminals (175, 275) represent the emitter and collector, the control terminal (164, 264) may comprise a base or a gate.

At least one switched terminal (175, 275) of low-side switch (152, 154, 160, 156, 158, 162) is coupled to a switched terminal (275, 275) of a corresponding high-side switch (151, 153, 159, 155, 157, 161) at a phase output terminal, which is coupled to the electric machine (12, 112). The other switched terminal of the low-side switch (152, 154, 160, 156, 158, 162) and the high-side switch (151, 153, 159, 155, 157, 161) are coupled to the direct current voltage bus 30.

The control terminal (164, 264) of each switch is coupled to a driver (24, 124). The driver (24, 124) provides a control signal to each control terminal (164, 264) a respective switch, such as a low-side switch (152, 154, 160, 156, 158, 162) or a high-side switch (151, 153, 159, 155, 157, 161). Each control signal may comprise a square wave, a pulse train, or another signal having a corresponding phase or phase offset with respect to other control signals (e.g., that are applied to respective other switches).

Figure 3A:
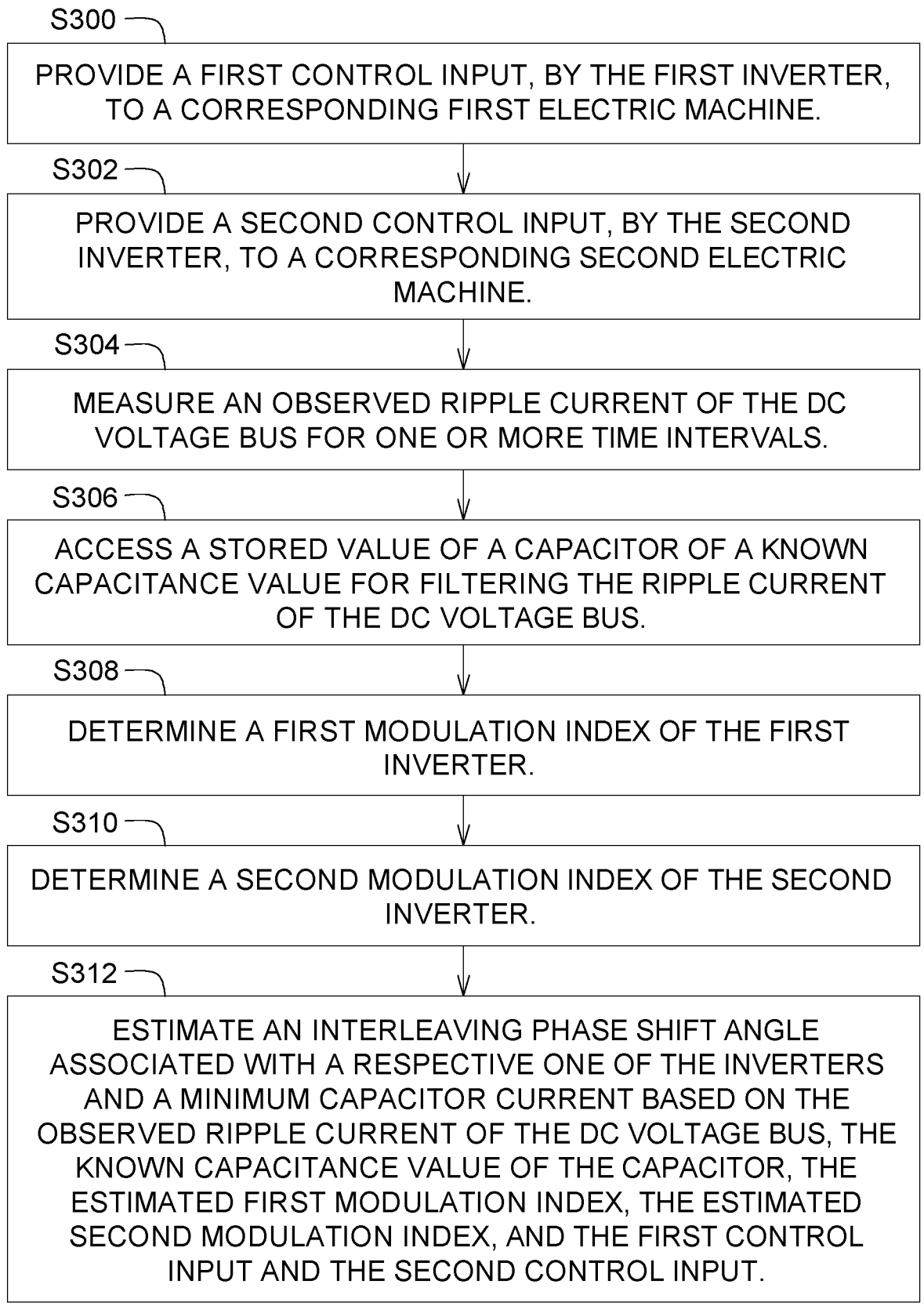
FIG. 3A is a first embodiment of a method for determining or estimating a target interleaving phase shift (e.g., for a respective sampling interval) associated with a corresponding DC bus current based on various input parameters, alone, or in conjunction with, a search process.

FIG. 3A is a first embodiment of a method for determining or estimating a target interleaving phase shift (e.g., for a respective sampling interval) associated with a corresponding DC bus current based on various input parameters, alone, or in conjunction with, a search process. The method of FIG. 3A begins in step S300.

In step S300, a first inverter 14 or electronic data processor (22, 122) is configured to provide a first control input 44 to a corresponding first electric machine 12. For example, a driver (24, 124) (e.g., driver (24, 124) circuit) is configured to provide a first control signal at a corresponding phase or reference phase to the control terminals (164, 264) of semiconductor devices of the inverter. In some embodiments, the first control input 44 may be applied to one or more stator windings associated with the first phase, second phase and third phase, respectively, of the first electric machine 12 or multiple phases of the first electric machine 12, where the first control input 44 is outputted at the output terminals of the first inverter for first phase 301, second phase 302 and third phase 303 for the corresponding first electric machine 12.

In step S302, a second inverter 114 or electronic data processor (22, 122) is configured to provide a second control input 46 to a corresponding second electric machine 112. For example, a driver (24, 124) (e.g., driver (24, 124) circuit) is configured to provide a second control signal at a corresponding phase offset (with respect to the reference phase) to the control terminals (164, 264) of semiconductor devices of the second inverter 114, where the phase offset is generated or selected to support interleaving (as described below in the method of FIG. 3A) to reduce potentially alternating current ripple that would otherwise be present on the DC bus. In some embodiments, the second control input 46 may be applied to one or more stator windings associated with the first phase, second phase and third phase, respectively, of the second electric machine 112 or multiple phases of the second electric machine 112, where the second control input 46 is outputted at the output terminals of the second inverter 112 for first phase 301, second phase 302 and third phase 303 for the corresponding second electric machine 112. Here, both the first inverter 14 and the second inverter 114 may be coupled to the same direct current (DC) bus 30 or a common DC bus.

In an alternate embodiment, it is possible that a set of two or more inverters are coupled to the same direct current bus (DC) bus 30 and drive corresponding electric motors, where each driver (24, 124) is configured to provide a control signal at a corresponding different phase offset (with respect to the reference phase of the first inverter 14, which can be a lead, supervisory or primary controller).

In step S304, a sensor 32 (e.g., current sensor) or an observer (e.g., a ripple current observer 34) is configured to measure an observed ripple current of the direct current (DC) voltage bus 30 for one or more time intervals. For example, the observed ripple current of the DC voltage bus 30 or the root mean square (RMS) current of the DC bus capacitor 28 may comprise a particle cost to be minimized or optimized in accordance with a particle swarm optimization method.

In step S306, an estimator 36 (e.g., minimum current estimator) or electronic data processor (22, 122) configured to read, retrieve or access a stored value of capacitor 28 of a known capacitance 43 value for filtering the ripple current of the DC voltage bus 30. In an alternate embodiment, stored value of the known capacitance 43 value for filtering the ripple current of the DC voltage bus 30 may comprise a particle-cost constraint that can limit the possible minimum particle cost.

In step S308, a first inverter 14 or an electronic data processor (22, 122) is configured to determine a first modulation index 41 of the first inverter 14. For example, in an alternate embodiment, the first modulation index 41 of the first inverter 14 may comprise a first constraint that limits the search pace of the particle swarm optimization method to be less than the full search space of approximately positive 180 degrees (e.g., π radians) to appropriately negative 180 degrees (e.g., −π radians).

In step S310, a second inverter 114 or electronic data processor (22, 122) is configured to determine a second modulation index 45 of the second inverter 114. For example, the second modulation index 45 of the second inverter 114 may comprise a second constraint that limits the search pace of the particle swarm optimization method to be less than the full search space of approximately positive 180 degrees (e.g., π radians) to appropriately negative 180 degrees (e.g., −π radians).

In step S312, the estimator 36 (e.g., minimum current estimator) or electronic data processor (22, 122) is configured to estimate an interleaving phase shift angle associated with a respective one of the inverters (e.g., first inverter 14 and second inverter 114) and a minimum capacitor 28 current. The minimum capacitor current can be defined in with some variation among alternative, supplemental or complementary definitions. Throughout this document, the current on the DC bus voltage bus 30 or the capacitor current on the capacitor generally comprises: (1) a primary DC component of a primary magnitude and (2) a secondary alternating current (AC) component of a secondary magnitude that is less than the primary magnitude, where the secondary alternating current component can be referred to as the ripple current (e.g., RMS ripple current or unwanted AC noise component) on the DC voltage bus. The root-mean-square (RMS) ripple current can be defined as a difference between an instantaneous current (including AC noise component) of the DC voltage bus and the average current of the DC voltage bus (e.g., which can be integrated over a complete cycle based on the frequency range of the instantaneous current or its AC noise component). Sometimes, the RMS ripple current can be described or defined as a percentage of the average current over a sampling time period. In general in step S312, the estimator 36 (e.g., minimum current estimator) or electronic data processor (22, 122) is configured to estimate an interleaving phase shift angle associated with a respective one of the inverters (e.g., first inverter 14 and second inverter 114) and a minimum capacitor 28 current based on the observed ripple current of the DC voltage bus 30 or equivalent or similar ripple current through the DC bus capacitor 28 (e.g., by sensor 32, alone or together with ripple current observer 34), the known capacitance 43 value of the capacitor 28, the estimated first modulation index 41, the estimated second modulation index 45, and the first control input 44 and the second control input 46.

Step S312 may be executed in accordance with various techniques that are applied separately or cumulatively. Under a first technique, the estimator 36 (e.g., minimum current estimator) or electronic data processor (22, 122) is configured to estimate an interleaving phase shift angle (as a particle position in a multidimensional search space of a particle swarm optimization process) associated with a respective one of the inverters (e.g., first inverter 14 and second inverter 114). For example, the particle swarm optimization process may use a swarm size or population of particles, where a particle has a particle position (e.g., phase shift angle) that is propagated from present interval to a next interval during an iteration of the swarm optimization process, where the particle cost can be optimized or minimized with a minimum number of particles (e.g., approximately twenty particles or less) and a minimum threshold of iterations of the process, such as one or more iterative loops of process of FIG. 3A, FIG. 3B, FIG. 3C, FIG. 4 and/or FIG. 5 for each estimating each particle position (of a respective particle) successively in accordance with one or more propagation equations.

Under a second technique, the estimator 36 (e.g., minimum current estimator) or electronic data processor (22, 122) is configured to estimate an interleaving phase shift angle associated with a respective one of the inverters (e.g., first inverter 14 and second inverter 114), where a particle position with a global minimum cost based on any of the following: (a) minimizing the ripple current (e.g., root-mean-squared (RMS) ripple current) on the DC bus, or (b) minimizing the root-mean-squared (RMS) DC bus capacitor current, on capacitor 28 (e.g., as representative of the capacitor ripple current), or (c) minimizing an alternating current component of the DC bus voltage current, and/or (d) minimizing the total current on the DC voltage bus 30. Further, the particle position is confined or limited to multidimensional search space (e.g., from approximately positive 180 degrees to approximately negative 180 degrees) of a particle swarm optimization process represents the final or refined interleaving phase shift angle associated with a respective one of the inverters (e.g., first inverter 14 and second inverter 114).

Under a third technique, the estimator 36 (e.g., minimum current estimator) or electronic data processor (22, 122) is configured to estimate an interleaving phase shift angle associated with a respective one of the inverters (e.g., first inverter 14 and second inverter 114), where a particle position with a global minimum cost (e.g., global best cost) of minimizing the ripple current on the DC bus or minimizing the root mean squared DC bus capacitor 28 current in a multidimensional search space (e.g., within a range of approximately positive 180 degrees to approximately negative 180 degrees) of a particle swarm optimization process represents the final or refined interleaving phase shift angle associated with a respective one of the inverters (e.g., first inverter 14 and second inverter 114), and wherein one or more of the following parameters are available for the particle swarm optimization process: (a) the known capacitance 43 value of the capacitor 28 comprises a particle-cost constraint that limits the particle cost; hence, the personal best particle cost and the global best particle cost; (b) sensor measurements of sensor 32, model estimations (e.g., based on electrical network equations), or both of observed ripple current of the DC voltage bus 30 or the root-mean squared through the DC bus capacitor 28; (c) the estimated first modulation index 41 comprising a first constraint of the search space to less than a full search space (e.g., within a range of approximately positive 180 degrees to approximately negative 180 degrees); (d) the estimated second modulation index 45 comprises a first constrain of the search space to less than a full search space (e.g., within a range of approximately positive 180 degrees to approximately negative 180 degrees); (e) first modulation scheme (e.g., pulse width modulation, space vector pulse width modulation, voltage per hertz control mode, motoring mode, generating mode) and/or (f) second modulation scheme (e.g., pulse width modulation, space vector pulse width modulation, voltage per hertz control mode, motoring mode, generating mode) the first control input 44 and the second control input 46.

Under a fourth technique, the estimator 36 (e.g., minimum current estimator) or electronic data processor (22, 122) is configured to estimate an interleaving phase shift angle associated with a respective one of the inverters (e.g., first inverter 14 and second inverter 114), where a gradient-free particle swarm optimizer is used (e.g., rather than a gradient ascent/descent approach) to minimize the ripple current on the DC bus or to minimize the root mean squared DC bus capacitor 28 current in a multidimensional search space (e.g., within a range of approximately positive 180 degrees to approximately negative 180 degrees) of final or refined interleaving phase shift angle associated with a respective one of the inverters (e.g., first inverter 14 and second inverter 114), and wherein one or more of the following parameters are available for the optimization or search process: (a) the known capacitance 43 value of the capacitor 28; (b) sensor measurements of sensor 32, model estimations (e.g., based on electrical network equations), or both of observed ripple current of the DC voltage bus 30 or the root-mean squared through the DC bus capacitor 28; (c) the estimated first modulation index 41 comprising a first constraint of the search space to less than a full search space (e.g., within a range of approximately positive 180 degrees to approximately negative 180 degrees); (d) the estimated second modulation index 45 comprises a first constrain of the search space to less than a full search space (e.g., within a range of approximately positive 180 degrees to approximately negative 180 degrees); (e) first modulation scheme (e.g., pulse width modulation, space vector pulse width modulation, voltage per hertz control mode, motoring mode, generating mode) and/or (f) second modulation scheme (e.g., pulse width modulation, space vector pulse width modulation, voltage per hertz control mode, motoring mode, generating mode) the first control input 44 and the second control input 46.

Under a fifth technique, the estimator 36 (e.g., minimum current estimator) or electronic data processor (22, 122) is configured to estimate an interleaving phase shift angle associated with a respective one of the inverters (e.g., first inverter 14 and second inverter 114 and a minimum capacitor current (e.g., capacitor current with DC and AC components, or with isolated AC components), such as based on particle position of a particle swarm optimization model to search for the interleaving phase shift angle to minimize or manage the DC voltage bus current, where the capacitor current or observed ripple current of the DC voltage bus comprises a particle cost (e.g., global best cost over multiple iterations of position propagations) of the particle swarm optimization model to search for the refined or optimum interleaving phase shift angle to minimize or manage the DC bus current. The particle swarm optimization model or process comprises estimating an estimated minimum capacitor current of the capacitor 28, which is coupled in parallel across terminals DC voltage bus, as the global best cost or global minimum cost. Further, the global best cost or global minimum can be graphed as in a multi-dimensional search space, such as a multi-dimensional surface function with each particle position in the swarm plotted on the multi-dimensional surface function to converge or coalesce to a common region, which is indicative of the global best cost, over multiple iterations of the propagating particle positions in accordance with the propagation equations of the particle swarm optimization model or process.

Under a sixth technique, the estimator 36 (e.g., minimum current estimator) or electronic data processor (22, 122) is configured to estimate an interleaving phase shift angle associated with a respective one of the inverters (e.g., first inverter 14 and second inverter 114 applying the following propagation equations to converge on a global particle position representative of the interleaving phase for a corresponding minimum ripple current of the DC voltage bus:

$$V_{i+1} = wV_i + c_{1r_1}(P_{best} - P_i) + c_{2r_2}(P_{globalbest} - P_i); \text{ which is} \quad \text{Equation 1;}$$

$$P_{i+1} = (P_i \pm V_{i+1}); \text{ which is} \quad \text{Equation 2;}$$

where:
- $P_i$ is position or location of a subject particle at time interval i;
- $P_{i+1}$ is the position or location of the subject particle at the interval i+1;
- $V_i$ is the velocity at time interval i of the subject particle under evaluation;
- $V_{i+1}$ is the velocity of the subject particle at the time interval i+1, which occurs after time interval i;
- w is the inertial coefficient;
- $c_1$ is the cognitive coefficient or personal best acceleration coefficient for the subject particle; $c_1$, alone or together with $c_2$, controls how much weight should be given between refining the search result of the particle itself and recognizing the search result of the swarm;
- $c_2c_1c_2$, $r_1$ is the social coefficient or the global best acceleration coefficient for the subject or any particle in the swarm; alone or together with controls how much weight should be given between refining the search result of the particle itself and recognizing the search result of the swarm;
- $c_2c_1c_2$, $r_1$ is a random number between 0 and $2\pi$ radians (e.g., and/or bounded between particle positions from 0 and $2P_i$);
- $r_2$ is a random number between 0 and $2\pi$ radians (e.g., and/or bounded between particle positions from 0 and $2P_i$);
- ± means plus (+) or minus (−);
- $P_{best}$ is the personal best cost; and
- $P_{globalbest}$ is the global best cost, which is associated with the minimum alternating current component or the ripple current on the DC voltage bus.

Figure 3B:
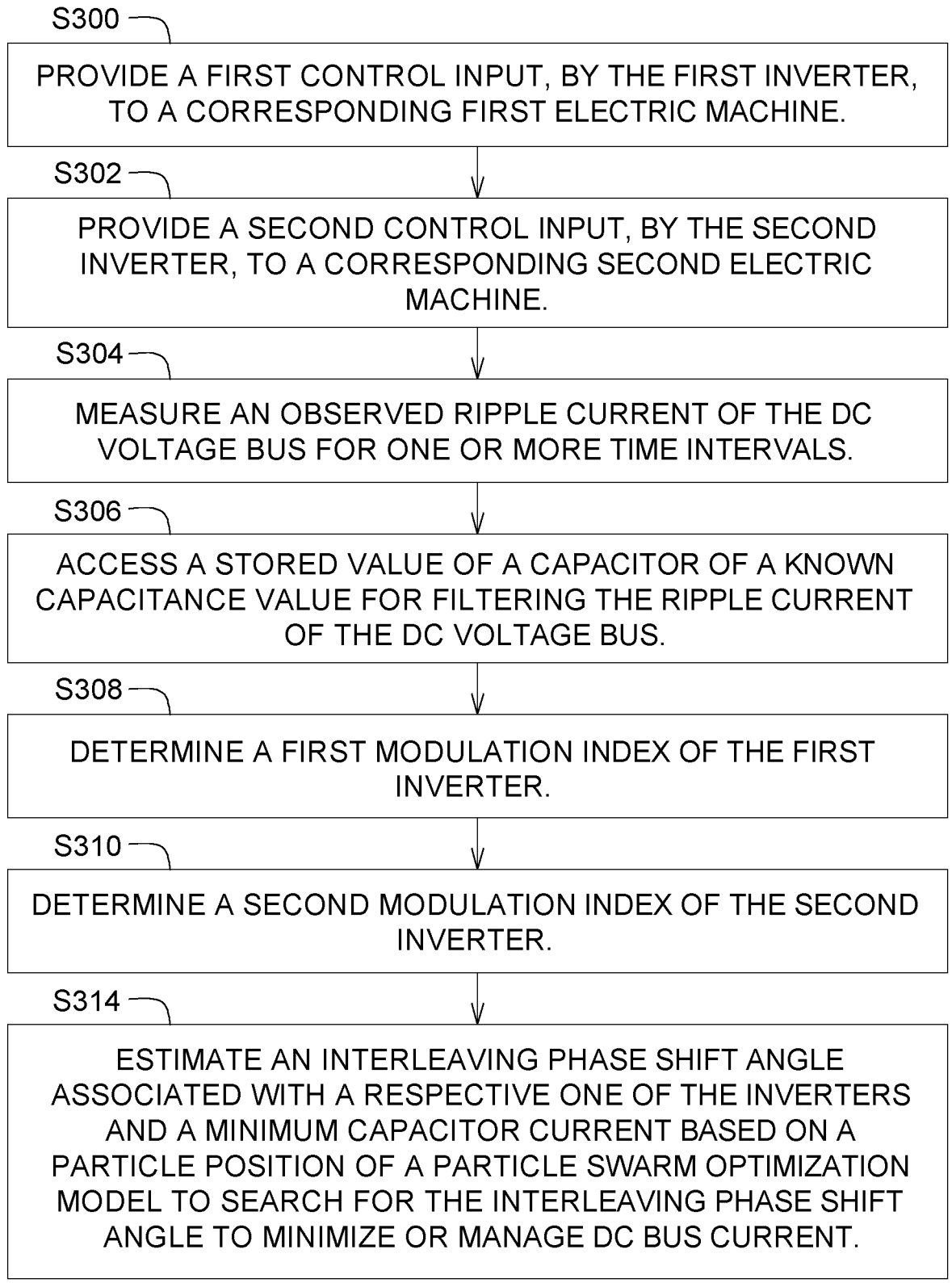
FIG. 3B is a second embodiment of a method for determining or estimating a target interleaving phase shift (e.g., for a respective sampling interval) associated with a corresponding DC bus current based on various input parameters, alone, or in conjunction with, a search process.

FIG. 3B is a second embodiment of a method for determining or estimating a target interleaving phase shift (e.g., for a respective sampling interval) associated with a corresponding DC bus current based on various input parameters, alone, or in conjunction with, a search process. The method of FIG. 3B is similar to the method of FIG. 3A, except the method of FIG. 3B replaces step S312 of FIG. 3A with step S314. Like steps, procedures and elements in any set of drawings represents like elements.

In step S312, the estimator 36 (e.g., minimum current estimator) or electronic data processor (22, 122) is configured to estimate an interleaving phase shift angle associated with a respective one of the inverter (e.g., first inverter 14 and second inverter 114) and a minimum capacitor 28 current based on a particle position of a particle swarm optimization module to search for the interleaving phase shift angle to minimize or manage the DC bus current.

Figure 3C:
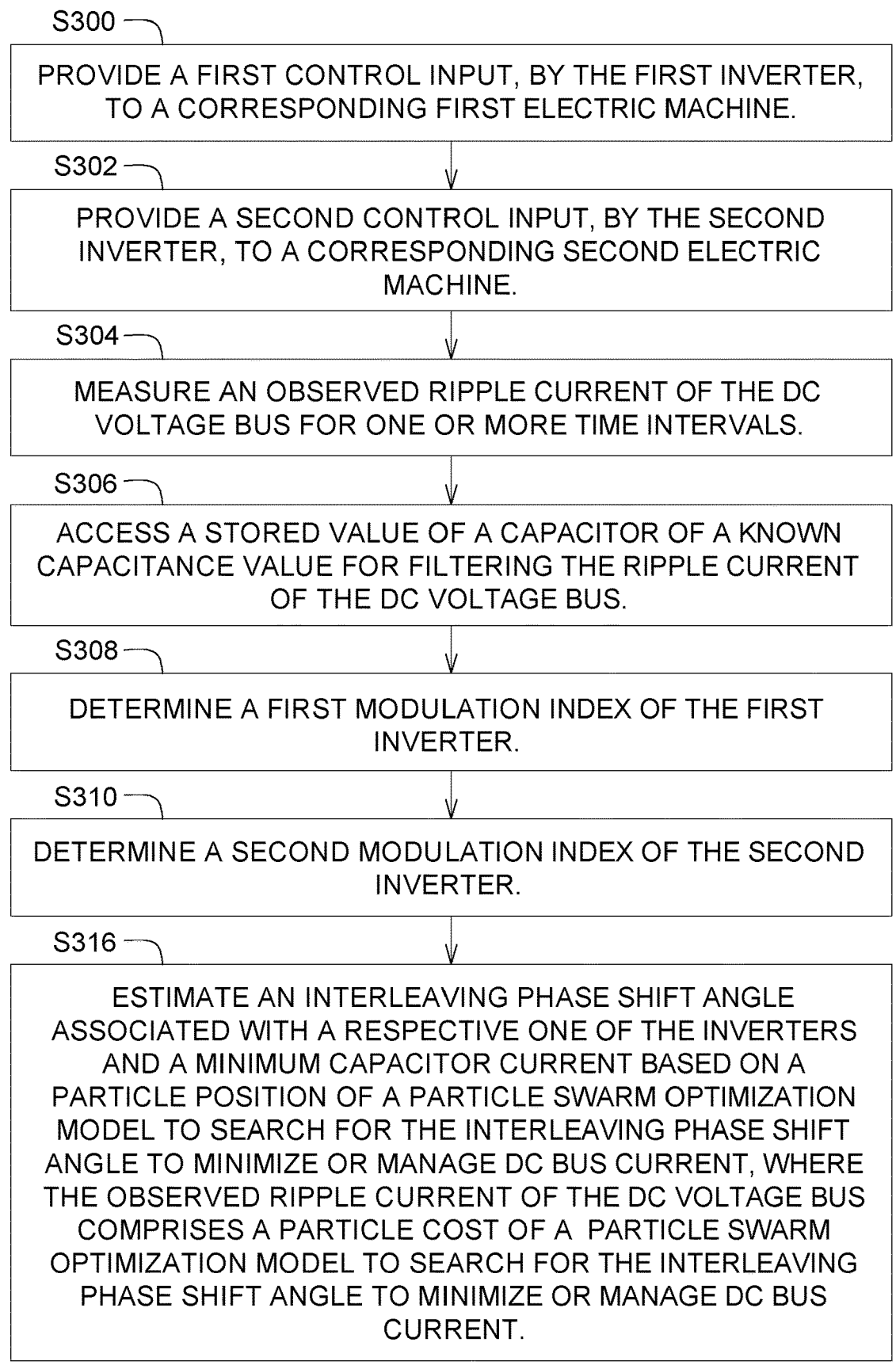
FIG. 3C is a third embodiment of a method for determining or estimating a target interleaving phase shift (e.g., for a respective sampling interval) associated with a corresponding DC bus current based on various input parameters, alone, or in conjunction with, a search process.

FIG. 3C is a third embodiment of a method for determining or estimating a target interleaving phase shift (e.g., for a respective sampling interval) associated with a corresponding DC bus current based on various input parameters, alone, or in conjunction with, a search process. The method of FIG. 3C is similar to the method of FIG. 3A, except the method of FIG. 3C replaces step S312 of FIG. 3A with step S316. Like steps, procedures and elements in any set of drawings represents like elements.

In step S312, the estimator 36 (e.g., minimum current estimator) or electronic data processor (22, 122) is configured to estimate an interleaving phase shift angle associated with a respective one of the inverters (e.g., first inverter 14 and second inverter 114) and minimum capacitor 28 current based on a particle position of a particle swarm optimization model to search for the interleaving phase shift angle to minimize or manage DC bus current, where the observed ripple current of the DC voltage bus 30 comprises a particle cost of a particle swarm optimization model to search for the interleaving phase shift angle (e.g., applied to the control signals of certain semiconductor switches) to minimize or manage the DC bus current.

Figure 4:
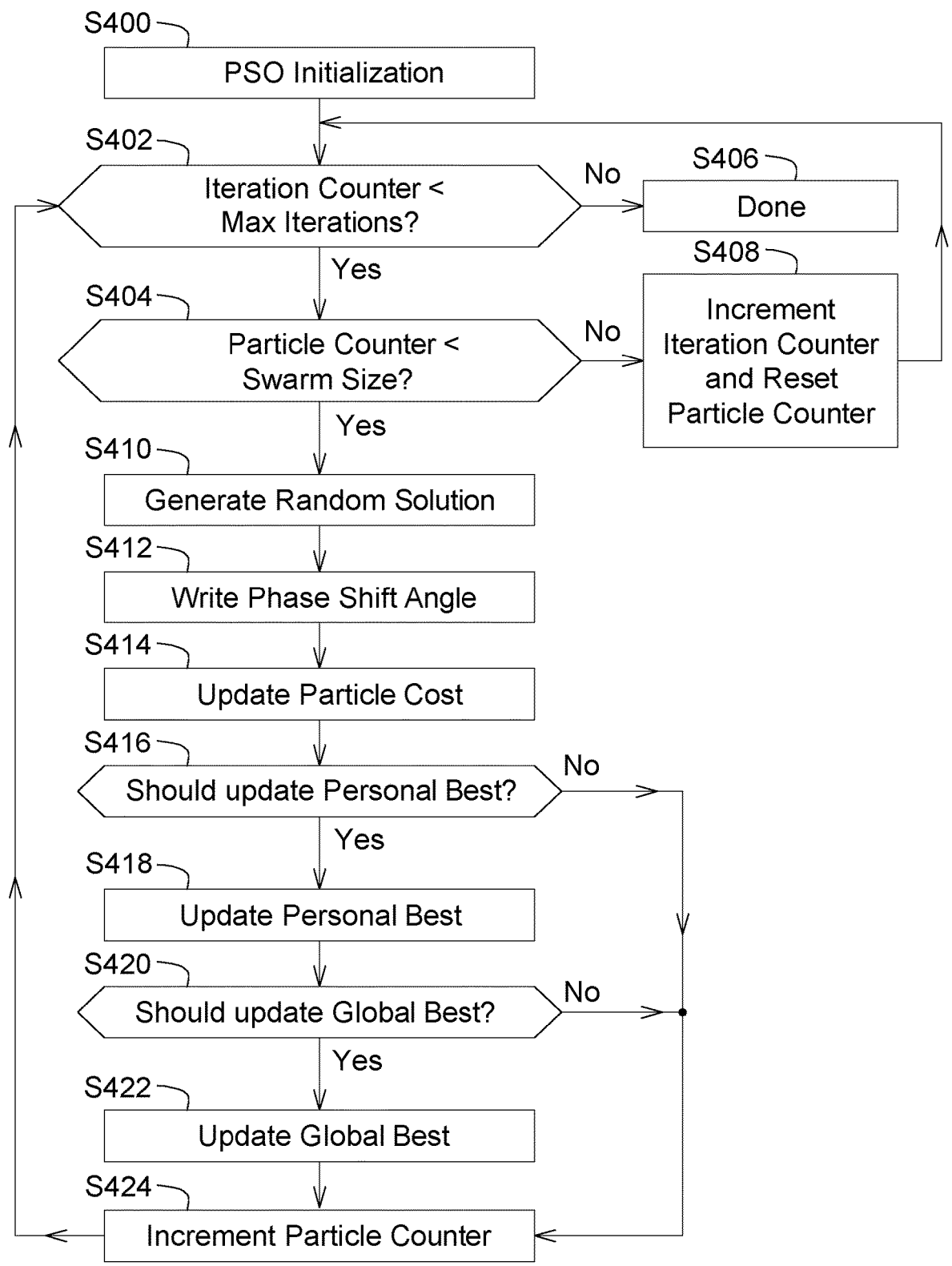
FIG. 4 is one embodiment of a flow chart of a method for determining or estimating a target interleaving phase shift (e.g., for a respective sampling interval) associated with a corresponding DC bus current based on various input parameters in accordance with a particle swarm optimization model.

FIG. 4 is one embodiment of a flow chart of a method for determining or estimating a target interleaving phase shift (e.g., for a respective sampling interval) associated with a corresponding DC bus current based on various input parameters in accordance with a particle swarm optimization model. The method of FIG. 4 begins in step S400.

In step S400, the estimator 36 or electronic data processor (22, 122) begins in initialization or particle swarm optimization (PSO) process initialization. The PSO process is an iterative approach that applies the steps of FIG. 4 to successive particles (e.g., candidate solutions) for at least a minimum number of iterations (e.g., 5 to 10 iterations) that are required to converge on a reliable solution of the particle position associated with the corresponding minimum particle cost, which can be referred to as the global best cost amongst the processed particles with respective estimated particle positions in accordance with the propagation equations (e.g., Equation 1 and Equation 2). Under the PSO approach, particles can move around randomly throughout the search space (e.g., bounded by an angular range of phase offsets or target phase offsets), or as defined by a set of one or more propagation equations (e.g., Equations 1 and Equations 2). In one configuration, one iteration of the process propagates each and every particle in the swarm from a current position to a next position. In another configuration, one iteration of the process propagates a selected particle in the swarm or a set of particles from a current position to a next position. During successive iterations, each of the particles or set of particles will converge to a similar particle position (e.g., identical or substantially similar) within the search space (e.g., within an angular range of target interleaving angles).

Throughout the document, the following definitions of terms apply to the PSO process. A particle means a potential solution, such as a particle position or particle position in multidimensional search space. For example, here the particle position may represent one or more phase shift angles, or target phase offsets, or interleaving phase angle to support interleaving of the switching control of two or more inverters to minimize or ameliorate current ripple or alternating current magnitude on a common DC bus that provides energy to the inverters. A swarm is a set, group or population of particles. The swarm size represents the total number of particles within the swarm. A particle cost is a value to be optimized, where optimization may comprise finding any of the following: a lowest particle cost, a minimum particle cost, a highest particle cost, a maximum particle cost, or a range of particle costs between the lowest particle cost the highest particle cost. For example, here the particle cost represents a current ripple on the DC current bus that feeds the inverters, a magnitude of the alternating current component on the DC bus, or the root mean squared (RMS) current or voltage on the DC bus or through the DC bus capacitor 28.

In step S402, the estimator 36 or electronic data processor (22, 122) determines if the iteration counter is less than a maximum number of iterations or permitted iterations. Step S402 may be executed in accordance with various processes that may conducted separately or cumulatively.

Under a first process, the total number of iterations is established such that each and every particle of the swarm is processed a sufficient number of times to converge on a reliable particle position representative of the optimum or lowest particle cost, such as a global best cost, where the global best cost represents an optimum or minimum current ripple on the DC current bus that feeds the inverters, an optimum or minimum magnitude of the alternating current component on the DC bus, or the optimum or minimum root mean squared (RMS) current or voltage on the DC bus or through the DC bus capacitor 28.

Under a second process, the total number of iterations is established such that a representative set of particles of the swarm (e.g., lesser than the total number of particles of the entire swarm) is processed a sufficient number of times (e.g., at least once, but typically multiple times) to converge on a reliable particle position representative of the optimum or lowest particle cost, such as a global best cost, where the global best cost represents an optimum or minimum current ripple on the DC current bus that feeds the inverters, an optimum or minimum magnitude of the alternating current component on the DC bus, or the optimum or minimum root mean squared (RMS) current or voltage on the DC bus or through the DC bus capacitor 28.

As noted in this document, a particle position of a corresponding particle represents a candidate solution. The particle positions of the particles within the swarm represent the population or potential universe of candidate solutions, where these particle positions converge over time toward a common particle position or target particle position (e.g., after each iteration). If the iteration counter is less than the maximum number of iterations, the method continues with step S404. However, if the iteration counter is not less than the maximum number of iterations the method continues with step S406.

In step S406, the electronic data processor (22, 122) ceases or stops processing operations under the particle swarm model (e.g., for a time period, such as a wait time, an idle time or one or more sampling intervals). For example, the electronic data processor (22, 122) is done processing for a wait time period, after which the electronic data processor (22, 122) may begin again particle swarm optimization initialization in step S400, (e.g., where the wait time period would exceed the time period to execute the maximum number of iterations).

In step S404, the estimator 36 or the electronic data processor (22, 122) determines whether a particle counter is less than a swarm size. If the particle counter is less than the swarm size, the method continues with step S410. However, if the particular counter is not less than the swarm size, the method continues with step S408 to increment the iteration counter and to reset the particle counter. After step S408, the method returns to step S402, for example.

In step S410, for each iteration the estimator 36 or the electronic data processor (22, 122) generates a potential solution, such as an estimated particle position, for a corresponding particle in the swarm based on the optimization (e.g., minimization or maximization) of the particle cost. Here, the estimated particle position means a phase shift angle or a target phase offset (e.g., target interleaving phase shift) of the control signals to the control terminals (164, 264) (e.g., gates or bases of) the switching semiconductors of one or more inverters that are coupled in parallel to a common direct current bus. The particle position, which is representative of the phase shift angle or the target phase offset (e.g., target interleaving phase shift), is optimized based on a minimization mode or minimization of the DC bus capacitor 28 current or minimization of ripple in the capacitor 28 current, as measured or estimated by root mean squared (RMS) or alternating current ripple on the DC bus or across the terminals the DC bus capacitor 28.

Step S410 may be executed in accordance with various techniques, which may be applied separately or cumulatively. Under a first technique, the estimator 36 or electronic data processor (22, 122) generates a solution (e.g., of a candidate particle position), or a random solution of candidate particle position, within a defined search space or consistent with candidate solutions, where the solution might represent a location in multidimensional search space. For any solution (e.g., random solution) or solution based on the propagation equations, the defined search space (e.g., for $r_1$ and $r_2$ expressed in units of radians) may be limited to phase shift angles or target phase offsets between positive 180 degrees ($\pi$ radians) and negative 180 degrees ($-\pi$ radians) of the control signals to the semiconductor switches of the inverters or motor controllers. However, in other configurations to achieve increased processing speed to converge on a suitable global best solution of the target interleaving phase offset, the defined search space may be confined to a region (or reduced search space) within a tolerance range (e.g., approximately plus or minus 45 degrees) about any of the following: (a) fixed interleaving angle that is calculated based on the number of inverters in parallel in accordance with an equation such as, 360 degrees/N, where N is the number of parallel inverters and/or (b) fixed interleaving angle that is defined as 360 degrees*n/N, where n is the number of interleaving phase angles or n=N−1 and where N is the number of parallel inverters, among other possibilities.

Under a second technique for executing step S412, the estimator 36 or electronic data processor (22, 122) is configured to estimate the potential solution (e.g., particle location in the search space) be based on sampling (e.g., at a current or present time interval) a current population of candidate solutions or samples with particle positions that are propagated forward to a next state (e.g., at a next interval) or next particle position given the current particle position for the sample in a state transition model (e.g., Equations 1 and 2, individually or collectively), which may be based on any of the following: (a) acceleration of a respective particle in the search space, (b) velocity of a respective particle in the search space, (c) displacement of a respective particle during a timestep of the state transition model (e.g., Equations 1 and 2, individually or collectively) from a present interval to a next interval, and/or (d) randomly generated displacements or movements of the respective particles in search space during a timestep of the state transition model (e.g., Equations 1 and 2, individually or collectively) from a present interval to a next interval.

Under a third technique for executing step S412, the estimator 36 or electronic data processor (22, 122) is configured to estimate the potential solution (e.g., particle location in the search space) based on sampling (e.g., at a current or present time interval) a current population of candidate solutions or samples with particle positions that are propagated forward to a next state (e.g., at next time interval) or next particle position given the current particle position for the sample in a state transition model (e.g., Equations 1 and 2, individually or collectively), which may be based on any of the following: (a) acceleration of a respective set of particles in the search space, (b) velocity of a respective set of particles in the search space, (c) displacement of a respective set of particles during a timestep of the state transition model (e.g., Equations 1 and 2, individually or collectively) from a present interval to a next interval, and/or (d) randomly generated displacements or movements of the respective particles in search space during a timestep of the state transition model (e.g., Equations 1 and 2, individually or collectively) from a present interval to a next interval, where the respective set of particles represents multiple iterations of the steps of FIG. 4 for all of the particles or less than all of the particles.

Under a fourth technique for executing step S412, the estimator 36 or electronic data processor (22, 122) is configured to estimate the potential solution (e.g., particle location in the search space) based on sampling (e.g., at a current or present time interval) a current population of candidate solutions or samples with particle positions that are propagated forward to a next state (e.g., at next time interval) or next particle position given the current particle position for the sample in a state transition model in accordance with the following propagation equations (Equation 1 and Equation 2, individually and collectively):

$$V_{i+1} = wV_i + c_1 r_1 (P_{best} - P_i) + c_2 r_2 (P_{globalbest} - P_i); \text{ which is} \quad \text{Equation 1};$$

$$P_{i+1} = (P_i \pm V_{i+1}); \text{ which is} \quad \text{Equation 2};$$

where
- $P_i$ is position or location of the (subject) particle at time interval i;
- $P_{i+1}$ is the position or location of the (subject) particle at the interval i+1;
- $V_i$ is the velocity at time interval i of the (subject) particle under evaluation;
- $V_{i+1}$ is the velocity of the (subject) particle at the time interval i+1, which occurs after time interval i;
- w is the inertial coefficient;
- $c_1$ is the cognitive coefficient (which is also referred to as the personal best acceleration coefficient) for the subject particle; $c_1$, alone or together with $c_2$, controls how much weight should be given between refining the search result of the particle itself and recognizing the search result of the swarm;
- $c_2 c_1 c_2$, $r_1$ is the social coefficient (which is also referred to as the global best acceleration coefficient) for the subject or any particle in the swarm; alone or together with controls how much weight should be given between refining the search result of the particle itself and recognizing the search result of the swarm;
- $c_2 c_1 c_2$, $r_1$ is a random number between 0 and $2\pi$ radians (e.g., and/or bounded between particle positions from 0 and $2P_i$);
- $r_2$ is a random number between 0 and $2\pi$ radians (e.g., and/or bounded between particle positions from 0 and $2P_i$);

± means plus (+) or minus (−);

$P_{best}$ is the personal best cost; and $P_{globalbest}$ is the global best cost, which is associated with the minimum alternating current component (e.g., ripple) on the DC bus or the minimum root mean squared (RMS) DC bus capacitor 28 current with respect to all of the iterations of candidate solutions of particle positions of respective particles (e.g., of the entire swarm or a sufficient swarm size that is representative of the iteratively sampled or iteratively processed particles (with resultant estimated or propagated particle positions, of entire swarm).

Further, in Equations 1 and 2, $wV_i$ refers to an inertia component; $c_j r_j(P_{best}-P_i)$ refers to a personal best component; and $c_{kr_k}(P_{globalbest}-P_i)$ refers to a global best component. Equations 1 and 2 are part of iterative process of the method of FIG. 4 or FIG. 5, for example.

A particle cost is the value to be optimized, such as finding a minimum particle cost, a lowest particle cost, a highest particle cost, or a maximum particle cost. A personal best cost is a best solution of a respective particle over multiple iterations (e.g., sufficient iterations) or over all iterations, where the multiple iterations may meet or exceed a minimum threshold required for convergence on a reliable best solution. A global best cost is the best solution of the swarm or group of particles over multiple iterations or over all iterations, where the multiple iterations may meet or exceed a minimum threshold required for solution a reliable global best cost.

The inertial coefficient (w) may range between an upper limit and a lower limit; where a higher value at or below the upper limit is consistent with exploration of potential solutions or particle positions; where a lower value at or above the lower limit is consistent with convergence of the potential or candidate solutions to a reliable solution or estimated particle position that satisfies the particle cost. The inertia component or inertia coefficient (e.g., which could be normalized from 0 to 1) may be time varying to decay or decrease with each iteration of the method of FIG. 4 or FIG. 5. If the personal acceleration coefficient ($c_1$) is higher, then the personal best cost has a stronger influence on convergence to a reliable solution or estimated particle position that satisfies the particle cost. Meanwhile, if the global acceleration coefficient ($c_2$) is higher, then the global best cost has a stronger influence on convergence to a reliable solution (e.g., target interleaving phase shift angle that minimizes ripple current or that minimizes the magnitude of alternating current component of the DC bus) or estimated particle position that satisfies the particle cost. In one embodiment, the personal acceleration coefficient and the global acceleration coefficient are equal weighted. However, in other embodiments, the personal acceleration coefficient or the global acceleration coefficient may have different weights.

In step S412, the estimator 36 or electronic data processor (22, 122) writes or provides a phase shift angle or target phase offset (e.g., interleaving target phase offset) as an input signal to control terminals (164, 264) (e.g., gates or bases) of semiconductor switches one or more inverters that are coupled in parallel to a common DC bus. For example, the estimator 36 or electronic data processor (22, 122) provides a respective phase shift angle or target phase offset (or one or more inverters among at least two inverters in parallel) that is consistent with the solution (e.g., particle location in search space) or random solution generated by the electronic data processor (22, 122).

In step S414, the estimator 36 or electronic data processor (22, 122) updates the particle cost, which is representative of the ripple current, or magnitude of alternating current component of the DC bus, or the RMS current of the DC bus capacitor 28 that supply electrical energy to the inverters. For example, the estimator 36 or electronic data processor (22, 122) may seek to minimize the particular cost to a lowest cost particle in a minimization mode (e.g., minimum AC current on the DC bus or minimum, minimum ripple current magnitude on the DC bus, or minimum RMS current on the DC bus capacitor 28) or to maximize a fitness function to a maximum cost particle of a virtual particle within multidimensional space for a maximization mode. In some embodiments, the velocity (e.g., referenced in step S410) of each particle is updated based on the costs and is available to all of particles within the swarm.

In an alternate embodiment, to reach rapid convergence on a solution for the interleaving phase offset to minimize or reduce ripple current on the DC bus, the velocity, displacement or motion or position of the particle is bounded by both a lowest cost particle and a maximum cost particle as constrains within successive iterations of the search space, such that the phase angle or target phase offset has a range or is bounded by a range defined by a set of candidate particle positions.

In step S416, the estimator 36 or electronic data processor (22, 122) decides whether or not to update the personal best (e.g., lowest particle cost in a minimization mode, or a maximum particle cost in a maximization mode) of a corresponding particle (e.g., candidate solution) for a respective iteration of step S416. For a series of successive iterations of the method or process of the method of FIG. 4 including by not limited to step S416, the data processor stores a personal best (e.g., lowest particle cost indicative of a minimum AC current on the DC bus or minimum, minimum ripple current magnitude on the DC bus, or minimum RMS current on the DC bus capacitor 28) in a data storage device 19 or data register for each particle such that the personal best if each particle (evaluated in an iteration) is available to the remainder of the particles (e.g., candidate solutions) within the swarm (e.g., population). In one or more iterations of processing particles, an electronic data processor (22, 122) or estimator 36 updates (in a data storage device 19 or data register) a prior personal best (e.g., representative of a prior lowest particle cost in a minimization mode, or a prior maximum particle cost in a maximization mode for a single corresponding particle) of the particle cost that is better, improved or superseded by a new or next personal best (e.g., new or next personal best) of the particle cost. For example, in the minimization mode, a prior personal best (in a data storage device 19 or register) is replaced by a next or new personal best of the lowest particle cost that is lower than the prior personal best by a threshold (e.g., tolerance). Similarly, in the maximization mode, a prior personal best (in a data storage device 19 or data register) is replaced by a next or new personal best of the maximum particle cost of the maximum particle cost that is greater than the prior personal best by a threshold (e.g., tolerance). The estimator 36 or electronic data processor (22, 122) is configured to maintain (in a data storage device 19 or data register) a prior personal best (e.g., prior personal best) of the particle cost that is not better, improved, or superseded by a new or next personal best (e.g., new or next personal best) of the particle cost. The personal best cost for one or more particles converges to the global best cost over multiple iterations of the PSO process, and can be used to limit the search space or to modify constraints during later iterations.

In step S416, if the estimator 36 or electronic data processor (22, 122) decides to update the personal best cost (e.g., lowest particle cost in a minimization mode, or a maximum particle cost in a maximization mode) of a corresponding particle (e.g., candidate solution), the method continues with step S418. However, if the estimator 36 or electronic data processor (22, 122) decides not to update the personal best, the method continues with step S424.

In step S418, the estimator 36 or electronic data processor (22, 122) is configured to update the personal best cost of the particle cost (e.g., lowest particle cost in a minimization mode, or a maximum particle cost in a maximization mode) for a corresponding particle for each respective iteration of step S418. The swarm of particles converges toward or trends toward the best global solution over multiple iterations.

In step S420, the estimator 36 or electronic data processor (22, 122) decides whether or not to update the global best cost (e.g., particle location representative of the phase offset or phase angle for inverter control signal of one or more inverters coupled in parallel) of a corresponding particle, where the global best cost is the lowest particle cost for the entire swarm (e.g., population) in a minimization mode or a maximum particle cost for the entire swarm in a maximization mode. In practice, step S420 becomes effective once a minimum number of iterations of the method of FIG. 4 have been executed such that the candidate solutions tend to be more representative of a global candidate solution than a local candidate solution.

In step S420, the estimator 36 or electronic data processor (22, 122) decides whether or not to update the global best cost of a corresponding particle. The global minimum or lowest cost of the swarm may be associated with the aggregate lowest cost of each of the contributing particles over a threshold minimum number of iterations through the steps of the process of FIG. 4. A particle or particle location is influenced by its personal best cost and the global best cost of the swarm or group of particles.

If the estimator 36 or data processor decides to update the global best cost, the method continues with step S422. However, if the estimator 36 or electronic data processor (22, 122) does not decide to update the global best cost, then the method continues to step S424.

In step S424, the estimator 36 or electronic data processor (22, 122) increments the particle counter to prepare for evaluation of the next particle in accordance with the method of FIG. 4 and returns to step S402 to iterate the steps again with respect to the next particle until the particle counter at S424 reaches the limit or the last particle within the swarm (e.g., population). However, typically, the estimator 36 or electronic data processor (22, 122) can reach a global best or global solution of a respective particle cost, such as a lowest particle cost, by a lesser number of iterations that the total number of particles within the swarm.

Figure 5:
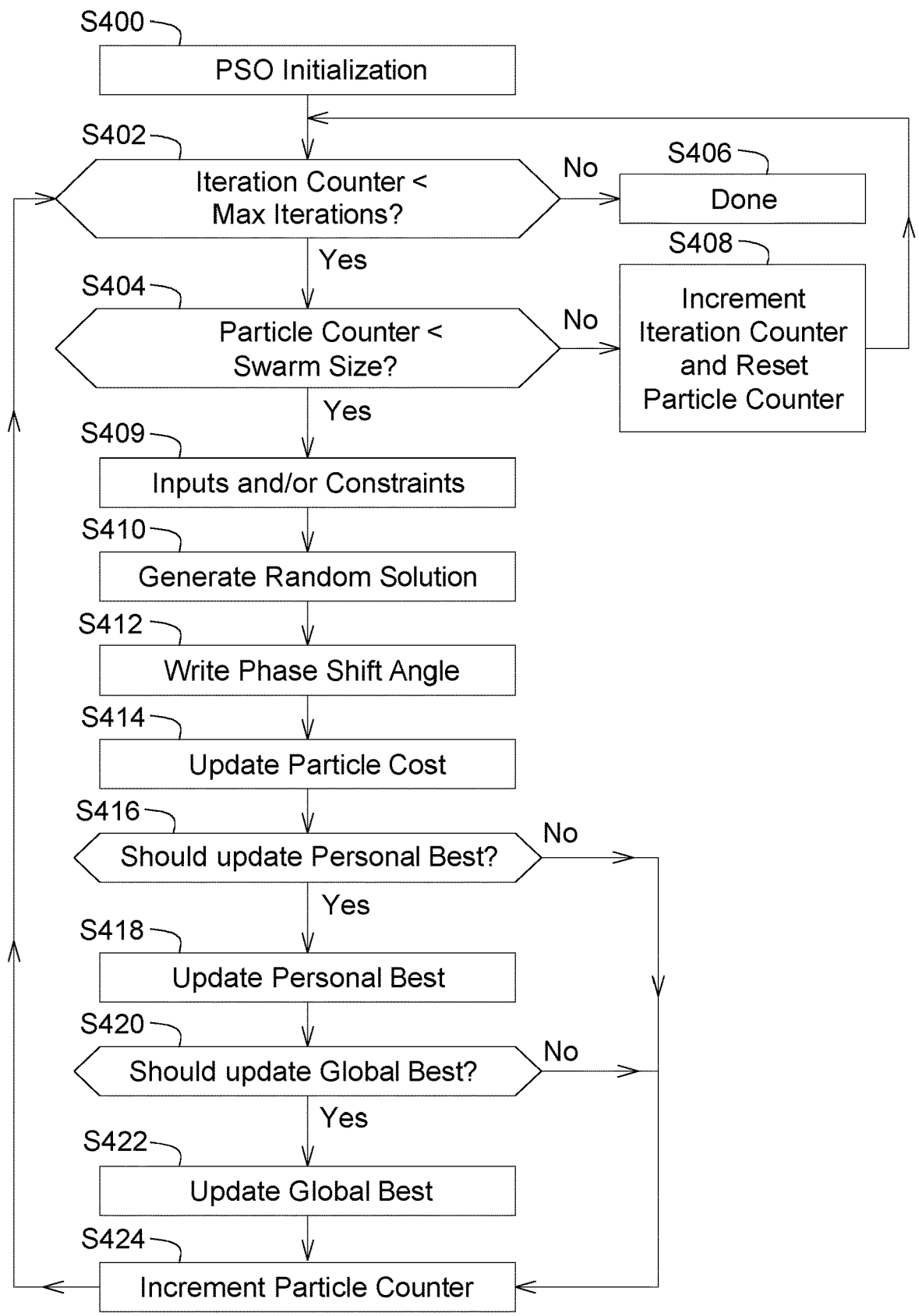
FIG. 5 is one embodiment of a flow chart of a method for determining or estimating a target interleaving phase shift (e.g., for a respective sampling interval) associated with a corresponding minimum DC bus current based on a particle swarm optimization model.

FIG. 5 is one embodiment of a flow chart of a method for determining or estimating a target interleaving phase shift (e.g., for a respective sampling interval) associated with a corresponding DC bus current based on various input parameters in accordance with a particle swarm optimization model. The method of FIG. 5 is similar to the method of FIG. 4, except step S409 added to FIG. 5 and step S404 is modified to accommodate the addition of step S409.

In step S404, the estimator 36 or the electronic data processor (22, 122) determines whether a particle counter is less than a swarm size. If the particular counter is less than the swarm size, the method continues with step S409. However, if the particular counter is not less than the swarm size, the method continues with step S408 to increment the iteration counter and the reset the particular counter. After step S408, the method returns to step S402, for example.

In step S409, the estimator 36 or the electronic data processor (22, 122) accepts inputs and constraints, such as limiting the boundary of the search space or multidimensional space of possible locations of particles (e.g., candidate solutions). Any constraints referenced in conjunction with the methods of FIG. 3A, FIG. 3B, and FIG. 4 may be applied to step S409 of FIG. 5.

In step S409, the electronic data processor (22, 122) or estimator 36 is configured to apply constraints separately or cumulatively, in accordance with the following techniques.

Under a first technique, stored value of the known capacitance 43 value for filtering the ripple current of the DC voltage bus 30 may comprise a particle-cost constraint that can limit the possible minimum particle cost.

Under second technique, the first modulation index 41 of the first inverter 14 may comprise a first constraint that limits the search pace of the particle swarm optimization method to be less than the full search space of approximately positive 180 degrees (e.g., $\pi$ radians) to appropriately negative 180 degrees (e.g., $-\pi$ radians).

Under a third technique, the second modulation index 45 of the second inverter 114 may comprise a second constraint that limits the search pace of the particle swarm optimization method to be less than the full search space of approximately positive 180 degrees (e.g., $\pi$ radians) to appropriately negative 180 degrees (e.g., $-\pi$ radians).

Under a fourth technique, to achieve increased processing speed of the estimator 36 or electronic data processor (22, 122) to converge on a suitable global best solution of the target interleaving phase offset, the defined search space may be confined to a region (or reduced search space) within a tolerance range (e.g., approximately plus or minus 45 degrees) about any of the following: (a) fixed interleaving angle that is calculated based on the number of inverters in parallel in accordance with an equation such as, 360 degrees/N, where N is the number of parallel inverters and/or (b) fixed interleaving angle that is defined as 360 degrees*n/N, where n is the number of interleaving phase angles or n=N−1 and where N is the number of parallel inverters, among other possibilities.

Instead of running the PSO process on the inverters (14, 114) and/or an accompanying vehicle controller (42) on a vehicle, any PSO process or method of FIG. 3A, FIG. 3B, FIG. 4 and FIG. 5 may be configured to store look-up tables, files, inverted files, data bases or other suitable data structures in the data storage device (19, 119) or data registers based on prior characterization of the operating regime/environment by training by default factory settings. Alternately, the operator of the vehicle may be authorized to conduct field training periodically with PSO installed on the vehicle to develop a set up look-up tables for storage and reference in the data storage device (19, 119) with interleaving phase offset values for ripple current reduction or minimization that are triggered by collection of data related to the number of active inverters (e.g., 14, 114) that are coupled to the same DC voltage bus 30, the observed ripple current of the DC voltage bus 30 or through the DC bus capacitor 28 by the ripple current observer 34, the known capacitance value of the DC bus capacitor stored in the data storage device (19, 119), the estimated first modulation index 41, the estimated second modulation index 45, and the first control input 44 (e.g., torque command and/or speed command via control module 18, such as a torque control module) and the second control input 46 (e.g., torque command and/or speed command via control module 118, such as torque control module), where the first control input and the second control input may be associated with a load setting or load range based on the vehicle and its operating environment.

Figure 6A:
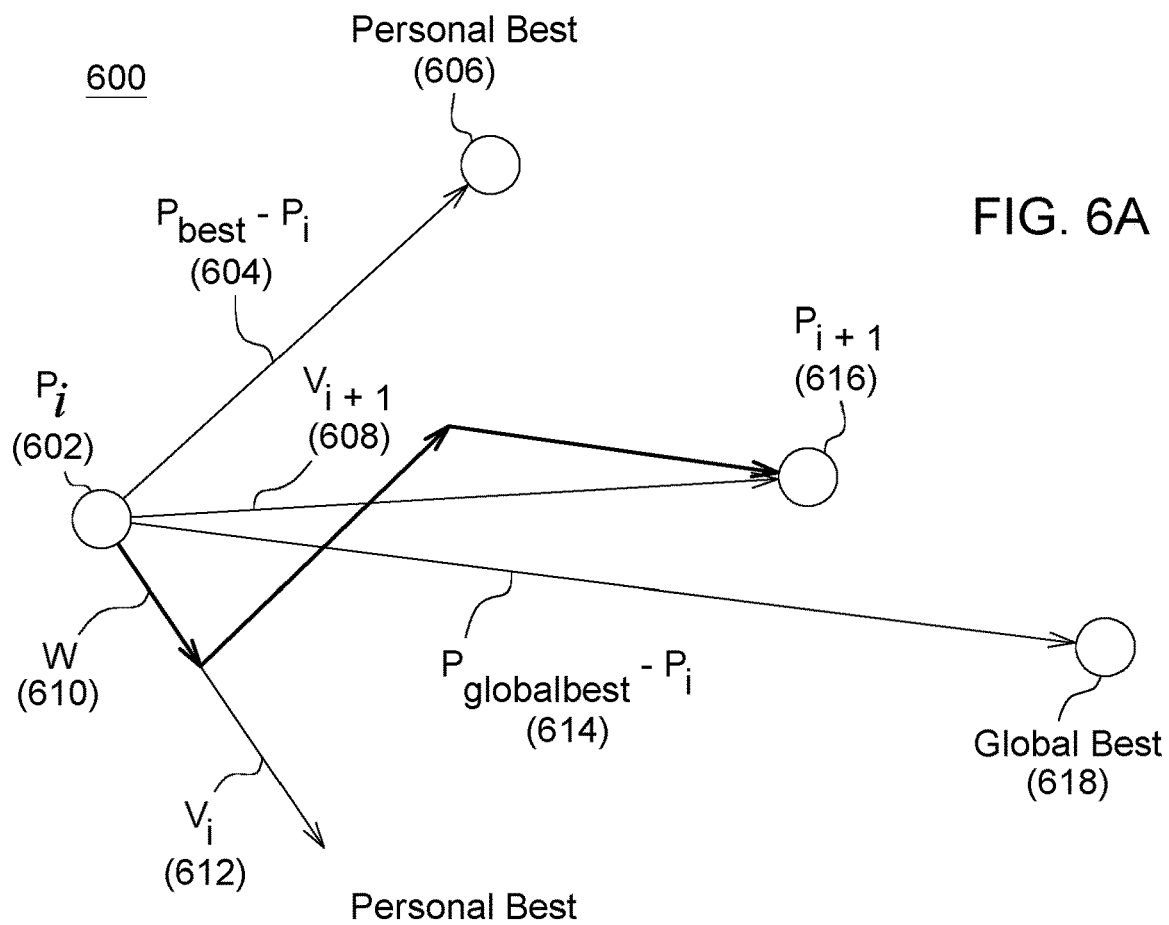
FIG. 6A is a graphical representation of one embodiment of determining or estimating a target interleaving phase shift associated with particle position $P_{i+1}$ at time interval i+1 for a particle swarm optimization model.
Figure 6B:
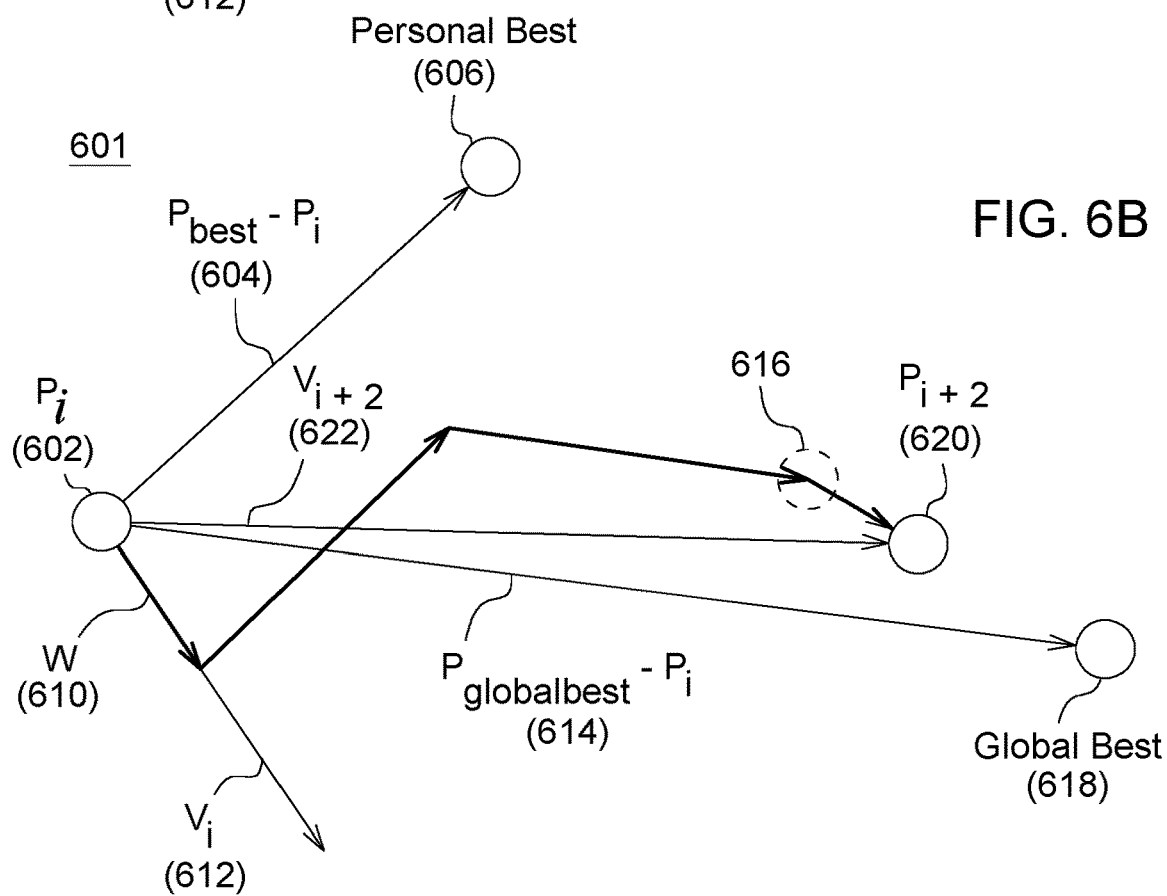
FIG. 6B is a graphical representation of one embodiment of determining or estimating a target interleaving phase shift associated with particle position $P_{i+2}$ at time interval i+2 of a particle swarm optimization model.

FIG. 6A is a graphical representation of one embodiment of determining or estimating a target interleaving phase shift or phase offset for one or more inverters among multiple inverters coupled to the same direct current (DC) bus 30. FIG. 6A illustrates the movement or propagation of the particle position at time interval, i, to time interval, i+1. FIG. 6A and FIG. 6B are consistent with the propagation equations of step S410 or S412 of FIG. 4 or FIG. 5, for example.

In FIG. 6A, $P_i$ (602) is position or location of the (subject) particle at time interval i. $P_{i+1}$ (616) is the position or location of the same (subject) particle at the interval i+1, which occurs after time interval i. $V_i$ (612) is the velocity at time interval i of the (subject) particle under evaluation. During the lapse or flow of time between time interval i and time interval i+1, the (subject) particle moves or is propagated from a first position $P_i$ to a second position $P_{i+1}$ by movement at a velocity vector of $V_{i+1}$ (608).

As illustrated in FIG. 6A, the second position $P_{i+1}$ (616) of the (subject) particle is a new personal best cost that supersedes or replaces the particle cost corresponding to first position $P_i$ (602) of the particle. Further, the second position 616 of the particle is converging or closer to the global best position 618 (e.g., of the swarm). The (prior) personal best cost 606 is positioned from the first position $P_i$ 602 or initial position at time interval i by the difference vector 604 formed by the difference between $P_{best}$ (606) and $P_i$ (602). Similarly, the global best cost 618 is defined by the difference vector between the first position $P_i$, (602) and $P_{globalbest}$ (618) at time interval i.

The $V_{i+1}$ (608) is the velocity of the (subject) particle at the time interval i+1, which in accordance with the equation (e.g., Equation 1 and Equation 2) is equal to the vector sum of the inertial component, the personal best component and the global best component. Recall that in the equation referenced in conjunction with step S410 or S412 or in FIG. 4 and FIG. 5, the $wV_i$ refers to an inertia component with inertia coefficient w (610) that tracks the same heading as vector $V_i$ (610) at time t; $C_j r_j(P_{best}-P_i)$ refers to a personal best component; and $c_{kr_k}(P_{globalbest}-P_i)$ refers to a global best component, where j represents the time interval associated with the personal best component and where k represents the time interval associated with the global best component.

FIG. 6B is a graphical representation of one embodiment of determining or estimating a target interleaving phase shift at a time interval of i+2, which follows time interval i+1 and i for a particle swarm optimization model. FIG. 6B is similar to FIG. 6A. Like reference numbers indicate like elements or features. Further, FIG. 6B shows motion or propagation of a change in particle position from a second interval, i+1, to a third interval, i+2, which results in a third position of the particle, $P_{i+2}$ (620) at time interval, i+2, which follows the second position of the particle $P_{i+1}$ (616) at time interval i+1.

While the above describes example embodiments of the present disclosure, these descriptions should not be viewed in a limiting sense. Rather, other variations and modifications may be made without departing from the scope and spirit of the present disclosure as defined in the appended claims.

The following is claimed:

1. A system for controlling a first inverter and a second inverter that are coupled to a direct-current (DC) voltage bus, the system comprising:
    the first inverter having inputs coupled to the DC voltage bus and outputs coupled to a corresponding first electric machine to provide a first control input;
    the second inverter having inputs coupled to the DC voltage bus and outputs coupled to a corresponding second electric machine to provide a second control input;
    a sensor coupled to the DC voltage bus, the sensor configured to measure, directly or indirectly, or to derive, an observed ripple current of the DC voltage bus for one or more time intervals;
    a capacitor of a known capacitance value for filtering the ripple current of the DC voltage bus;
    a first modulation index estimator configured to estimate a first modulation index of the first inverter;
    a second modulation index estimator configured to estimate a second modulation index of the second inverter; and
    a current estimator for estimating an interleaving phase shift angle associated with a respective one of the inverters and a minimum capacitor current based on the observed ripple current of the DC voltage bus, the known capacitance value of the capacitor, the estimated first modulation index, the estimated second modulation index, the first control input, and the second control input.

2. The system according to claim 1 wherein the current estimator comprises a minimum current estimator and an interleaving phase offset module, wherein the data storage device is configured to store a data structure or look-up table that is representative of a relationship between or among the known capacitance value of the capacitor, the estimated first modulation index, the estimated second modulation index, the first control input, the second control input, the minimum capacitor current, and interleaving phase shift angle.

3. The system according to claim 1 wherein the current estimator comprises a particle swarm optimization module.

4. The system according to claim 3 wherein the particle swarm optimization module comprises software instructions that are stored in data storage device for execution by an electronic data processor that is informed by or trained by application of on the observed ripple current of the DC voltage bus, the known capacitance value of the capacitor, the estimated first modulation index, the estimated second modulation index, the first control input, and the second control input.

5. The system according to claim 3 wherein the observed ripple current of the DC voltage bus comprises a particle cost of a particle swarm optimization process of the particle swarm optimization module.

6. The system according to claim 3 wherein the interleaving phase shift angle comprises a particle position of a particle swarm optimization process of the particle swarm optimization module.

7. The system according to claim 3 wherein the particle swarm optimization module is configured to provide an estimated minimum capacitor current as the global minimum cost; wherein the global minimum can be graphed as a multi-dimensional space, such as a multi-dimensional surface function.

8. The system according to claim 3 wherein the particle swarm optimization module applies the following propagation equations to converge on a global particle position representative of the interleaving phase for a corresponding minimum ripple current of the DC voltage bus:

$$V_{i+1} = wV_i + c_1 r_1(P_{best} - P_i) + c_2 r_2(P_{globalbest} - P_i);$$

$$P_{i+1} = (P_i \pm V_{i+1});$$

where:

$P_i$ is position or location of a subject particle at time interval i;

$P_{i+1}$ is the position or location of the subject particle at the interval i+1;

$V_i$ is the velocity at time interval i of the subject particle under evaluation;

$V_{i+1}$ is the velocity of the subject particle at the time interval i+1, which occurs after time interval i;

w is the inertial coefficient;

$c_1$ is the cognitive coefficient or personal best acceleration coefficient for the subject particle; $c_1$, alone or together with $c_2$, controls how much weight should be given between refining the search result of the particle itself and recognizing the search result of the swarm;

$c_2 c_1 c_2$, $r_1$ is the social coefficient or the global best acceleration coefficient for the subject or any particle in the swarm alone or together with controls how much weight should be given between refining the search result of the particle itself and recognizing the search result of the swarm;

$c_2 c_1 c_2$, $r_1$ is a random number between 0 and $2\pi$ radians;

$r_2$ is a random number between 0 and $2\pi$ radians;

± means plus (+) or minus (−);

$P_{best}$ is the personal best cost; and $P_{globalbest}$ is the global best cost, which is associated with the minimum alternating current component or the ripple current on the DC voltage bus.

9. The system according to claim 1 wherein a first modulation index estimator is configured to estimate a first modulation index of the first inverter based on a ratio of an observed maximum frequency change of the carrier frequency of the inverter to a maximum modulated frequency of a carrier the first inverter.

10. The system according to claim 1 wherein a second modulation index estimator configured to estimate a second modulation index of the second inverter based on a ratio of an observed maximum frequency change of the carrier frequency of the inverter to a maximum modulated frequency of a carrier of second inverter.

11. The system according to claim 1 wherein the first control input comprises a torque command, a speed command, or a first direct-axis current/voltage command and a first quadrature-axis current/voltage command for the one or more time intervals.

12. The system according to claim 1 wherein the second control input comprises torque command, a speed command, or a second direct-axis current/voltage command and a second quadrature-axis current/voltage command for the one or more time intervals.

13. The system according to claim 1 further comprising:
a user interface for inputting or providing a user command;
a vehicle controller configured to determine a first control input and the second control input based on the user command.

14. The system according to claim 1 further comprising:
an optional ripple current observer that is coupled to the sensor, the ripple current observer configured to estimate an observed ripple current of the DC voltage bus, an alternating current component of the DC voltage bus, or a DC bus capacitor current for one or more time intervals, where the optional ripple current observed can be used as in additional input to the current estimator to promote rapid convergence on a minimum current estimate associated with a corresponding interleaving phase solution for a sampling interval.

15. The system according to claim 1 wherein the estimated minimum capacitor current comprises an alternating current component of the DC bus voltage and wherein the alternating current component is expressed as root mean square current.

16. The system according to claim 1 wherein the first control input comprises a first operating point of the corresponding first electric machine and wherein the second control input comprises a second operating point of the corresponding second electric machine.

17. A method for controlling a first inverter and a second inverter that are coupled to a direct-current (DC) voltage bus, the method comprising:
providing a first control input, by the first inverter, to a corresponding first electric machine; providing a second control input, by the second inverter, to a corresponding second electric machine;
measuring an observed ripple current of the DC voltage bus for one or more time intervals;
accessing a stored value of a capacitor of a known capacitance value for filtering the ripple current of the DC voltage bus;
determining a first modulation index of the first inverter;
determining a second modulation index of the second inverter; and
estimating an interleaving phase shift angle associated with a respective one of the inverters and a minimum capacitor ripple current of the DC voltage bus, the known capacitance value of the capacitor, the estimated first modulation index, the estimated second modulation index, the first control input, and the second control input.

18. The method according to claim 17 wherein the estimating of the interleaving phase shift angle comprises estimating a minimum capacitor ripple current based on the particle position of a particle swarm optimization model to search for the respective interleaving phase shift angle that is configured to minimize root-mean-squared DC capacitor current as the capacitor ripple current, an alternating component of the DC voltage bus current, or a DC voltage bus ripple current.

19. The method according to claim 18 wherein the estimating of the interleaving phase shift angle comprises estimating an interleaving phase shift angle associated with a respective one of the inverters and a minimum capacitor current based on particle position of a particle swarm optimization model to search for the interleaving phase shift angle to minimize or manage the DC voltage bus current, where the observed ripple current of the DC voltage bus comprises a particle cost of the particle swarm optimization model to search for the interleaving phase shift angle to minimize or manage the DC bus current.

20. The method according to claim 18 wherein the capacitor ripple current or an observed ripple current of the DC voltage bus comprises a particle cost of a particle swarm optimization process of the particle swarm optimization model over multiple iterations of the particle swarm optimization process.

21. The method according to claim 18 wherein the interleaving phase shift angle comprises a particle position of a particle swarm optimization process of the particle swarm optimization model, wherein the particle position represents a global best cost.

22. The method according to claim 18 wherein the estimating of the interleaving phase shift further comprises applying the following propagation equations to converge on a global particle position representative of the interleaving phase for a corresponding minimum ripple current of the DC voltage bus:

$$V_{i+1} = wV_i + c_{1r_1}(P_{best} - P_i) + c_{2r_2}(P_{globalbest} - P_i);$$

$$P_{i+1} = (P_i \pm V_{i+1});$$

where:
- $P_i$ is position or location of a subject particle at time interval i;
- $P_{i+1}$ is the position or location of the subject particle at the interval i+1;
- $V_i$ is the velocity at time interval i of the subject particle under evaluation;
- $V_{i+1}$ is the velocity of the subject particle at the time interval i+1, which occurs after time interval i;
- w is the inertial coefficient;
- $c_1$ is the cognitive coefficient or personal best acceleration coefficient for the subject particle; $c_1$, alone or together with $c_2$, controls how much weight should be given between refining the search result of the particle itself and recognizing the search result of the swarm;
- $c_2 c_1 c_2$, $r_1$ is the social coefficient or the global best acceleration coefficient for the subject or any particle in the swarm; alone or together with controls how much weight should be given between refining the search result of the particle itself and recognizing the search result of the swarm;
- $c_2 c_1 c_2$, $r_1$ is a random number between 0 and $2\pi$ radians;
- $r_2$ is a random number between 0 and $2\pi$ radians;
- ± means plus (+) or minus (−);
- $P_{best}$ is the personal best cost; and
- $P_{globalbest}$ is the global best cost, which is associated with the minimum alternating current component or the ripple current on the DC voltage bus.

* * * * *